United States Patent
Fujita et al.

(10) Patent No.: US 10,955,235 B2
(45) Date of Patent: Mar. 23, 2021

(54) DISTANCE MEASUREMENT APPARATUS AND DISTANCE MEASUREMENT METHOD

(71) Applicant: MITSUBISHI ELECTRIC CORPORATION, Tokyo (JP)

(72) Inventors: Takeo Fujita, Tokyo (JP); Koichi Yamashita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 118 days.

(21) Appl. No.: 16/062,069

(22) PCT Filed: Jan. 6, 2017

(86) PCT No.: PCT/JP2017/000240
§ 371 (c)(1),
(2) Date: Jun. 13, 2018

(87) PCT Pub. No.: WO2017/163537
PCT Pub. Date: Sep. 28, 2017

(65) Prior Publication Data
US 2018/0372484 A1 Dec. 27, 2018

(30) Foreign Application Priority Data
Mar. 22, 2016 (JP) .............................. JP2016-056400

(51) Int. Cl.
*G01B 11/25* (2006.01)
*G06T 7/521* (2017.01)
(Continued)

(52) U.S. Cl.
CPC .......... *G01B 11/2513* (2013.01); *G01B 11/25* (2013.01); *G01B 11/254* (2013.01);
(Continued)

(58) Field of Classification Search
CPC . G01B 11/25; G01B 11/2513; G01B 11/2518; G01B 11/254; G06T 7/521; G06T 7/571
See application file for complete search history.

(56) References Cited

U.S. PATENT DOCUMENTS 6,205,243 B1 * 3/2001 Migdal .............. G01B 11/2518
382/154
6,697,164 B1 * 2/2004 Babayoff ........... A61B 1/00096
356/609

(Continued)

FOREIGN PATENT DOCUMENTS

JP          04-283608 A     10/1992
JP           5-332737 A     12/1993
(Continued)

*Primary Examiner* — David N Werner
(74) *Attorney, Agent, or Firm* — Birch, Stewart, Kolasch & Birch, LLP

(57) ABSTRACT

A distance measurement apparatus includes: a control unit that makes an imaging unit acquire a plurality of first captured images corresponding to light patterns when making an optical system set the focal length to a first focal length, and that makes the imaging unit acquire second captured images corresponding to the light patterns when making the optical system set the focal length to a second focal length; a first distance measurement unit that determines presence or absence of an image blur and acquires a first distance to a subject from an image blur index value indicating an extent of the image blur; a second distance measurement unit that acquires a second distance to the subject based on triangulation; and a measurement result synthesis unit that outputs the first distance for a pixel with the image blur and that outputs the second distance for a pixel with no image blur.

16 Claims, 9 Drawing Sheets

| | | DETERMINATION RESULT ON CAPTURED IMAGE WHEN FORCAL LENGTH IS SET TO FIRST (SHORT) FOCAL LENGTH f1 | | |
|---|---|---|---|---|
| | | ERROR | PRESENCE OF IMAGE BLUR | ABSENCE OF IMAGE BLUR |
| DETERMINATION RESULT ON CAPTURED IMAGE WHEN FORCAL LENGTH IS SET TO SECOND (LONG) FOCAL LENGTH f2 | ERROR | ERROR Qf = 0 Qi = 0 | ERROR Qf = 0 Qi = 0 | ABSENCE OF IMAGE BLUR Qf = 0 Qi = 1 |
| | PRESENCE OF IMAGE BLUR | ERROR Qf = 0 Qi = 0 | PRESENCE OF IMAGE BLUR Qf = 1 Qi = * | ABSENCE OF IMAGE BLUR Qf = 0 Qi = 1 |
| | ABSENCE OF IMAGE BLUR | ABSENCE OF IMAGE BLUR Qf = 1 Qi = 0 | ABSENCE OF IMAGE BLUR Qf = 1 Qi = 0 | ABSENCE OF IMAGE BLUR Qf = 0 Qi = * |

Qi = * : Ifn > Iff ⇒ Qi = 1
Ifn ≤ Iff ⇒ Qi = 0

(51) Int. Cl.
*G06T 7/571* (2017.01)
*G01C 3/32* (2006.01)
*G01C 3/12* (2006.01)
*G01C 3/10* (2006.01)

(52) U.S. Cl.
CPC .......... *G01B 11/2518* (2013.01); *G06T 7/521* (2017.01); *G06T 7/571* (2017.01); *G01C 3/10* (2013.01); *G01C 3/12* (2013.01); *G01C 3/32* (2013.01)

(56) References Cited

U.S. PATENT DOCUMENTS

| | | | | |
|---|---|---|---|---|
| 2001/0043335 | A1* | 11/2001 | Norita | G01B 11/2518 356/601 |
| 2002/0036779 | A1* | 3/2002 | Kiyoi | G01B 11/24 356/606 |
| 2003/0123707 | A1* | 7/2003 | Park | G06K 9/00201 382/106 |
| 2006/0072123 | A1* | 4/2006 | Wilson | G01B 11/2518 356/609 |
| 2007/0285672 | A1* | 12/2007 | Mukai | G01B 11/2518 356/603 |
| 2010/0118123 | A1* | 5/2010 | Freedman | G01B 11/25 348/46 |
| 2011/0142287 | A1 | 6/2011 | Wong et al. | |
| 2013/0120532 | A1* | 5/2013 | Milch | A61C 9/006 348/45 |
| 2013/0120533 | A1* | 5/2013 | Milch | G06T 7/55 348/45 |
| 2014/0119622 | A1* | 5/2014 | Babayoff | A61B 1/24 382/128 |
| 2014/0219502 | A1* | 8/2014 | Hirota | G01B 11/002 382/103 |
| 2015/0124055 | A1* | 5/2015 | Kotake | G01B 11/2513 348/46 |
| 2015/0138346 | A1* | 5/2015 | Venkataraman | G06T 7/596 348/135 |
| 2015/0138436 | A1* | 5/2015 | Wong | H04N 5/2257 348/374 |
| 2016/0123891 | A1* | 5/2016 | Ko | G01B 11/25 356/237.6 |
| 2016/0273913 | A1* | 9/2016 | Kitamura | G06T 7/571 |
| 2017/0202483 | A1* | 7/2017 | Sorimoto | G01B 11/2518 |
| 2018/0299262 | A1* | 10/2018 | Thiel | A61B 1/00193 |
| 2018/0340770 | A1* | 11/2018 | Arieli | G01N 21/4795 |

FOREIGN PATENT DOCUMENTS

| | | |
|---|---|---|
| JP | 2002-022424 A | 1/2002 |
| JP | 2012-083233 A | 4/2012 |
| JP | 2013-512626 A | 4/2013 |

\* cited by examiner

LIGHT PATTERN A1

PIXEL POSITION

LIGHT PATTERN A2

PIXEL POSITION

ABSENCE OF IMAGE BLUR

PRESENCE OF IMAGE BLUR

FIG. 5

| | DETERMINATION RESULT ON CAPTURED IMAGE WHEN FORCAL LENGTH IS SET TO FIRST (SHORT) FOCAL LENGTH f1 | | |
|---|---|---|---|
| | ERROR | PRESENCE OF IMAGE BLUR | ABSENCE OF IMAGE BLUR |
| DETERMINATION RESULT ON CAPTURED IMAGE WHEN FORCAL LENGTH IS SET TO SECOND (LONG) FOCAL LENGTH f2 — ERROR | ERROR<br>Qf = 0<br>Qi = 0 | ERROR<br>Qf = 0<br>Qi = 0 | ABSENCE OF IMAGE BLUR<br>Qf = 0<br>Qi = 1 |
| PRESENCE OF IMAGE BLUR | ERROR<br>Qf = 0<br>Qi = 0 | PRESENCE OF IMAGE BLUR<br>Qf = 1<br>Qi = * | ABSENCE OF IMAGE BLUR<br>Qf = 0<br>Qi = 1 |
| ABSENCE OF IMAGE BLUR | ABSENCE OF IMAGE BLUR<br>Qf = 1<br>Qi = 0 | ABSENCE OF IMAGE BLUR<br>Qf = 1<br>Qi = 0 | ABSENCE OF IMAGE BLUR<br>Qf = 0<br>Qi = * |

Qi = * : Ifn > Iff ⇒ Qi = 1
Ifn ≤ Iff ⇒ Qi = 0

FIG. 6(A)

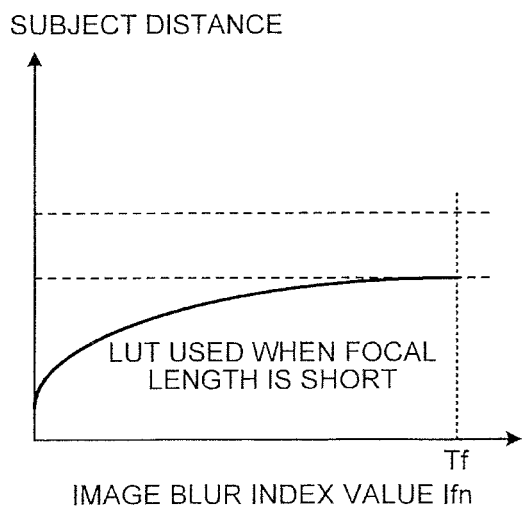

FIG. 6(B)

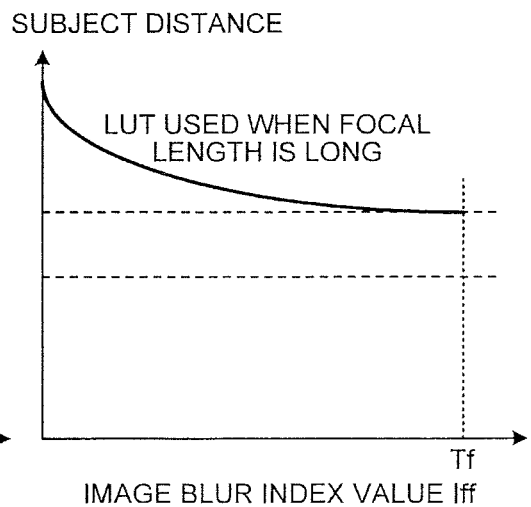

ERROR OCCURRENCE AREA

REFERENCE PIXELS ON LEFT SIDE OF ERROR OCCURRENCE AREA

REFERENCE PIXELS ON RIGHT SIDE OF ERROR OCCURRENCE AREA

REFERENCE PIXELS ON UPPER SIDE OF ERROR OCCURRENCE AREA

REFERENCE PIXELS ON LOWER SIDE OF ERROR OCCURRENCE AREA

DISTANCE MEASUREMENT APPARATUS AND DISTANCE MEASUREMENT METHOD

TECHNICAL FIELD

The present invention relates to a distance measurement apparatus and a distance measurement method that measure a distance to a subject.

BACKGROUND ART

There has conventionally been known a distance measurement apparatus that measures a distance (a subject distance) to a subject (an object) by using a blur amount of a captured image (image data) obtained by an imaging unit of a camera (for example, see Patent Reference 1). There has also been known an apparatus that measures a shape of an object to be measured on the basis of a captured image (image data) obtained by photographing the subject (object to be measured) with a camera which has been illuminated with light patterns by a light projection device (see Patent Reference 2, for example).

PRIOR ART REFERENCE

Patent Reference

PATENT REFERENCE 1: Japanese Patent Application Publication No. 2013-512626 (paragraphs 0009-0032, FIG. 1, FIG. 2A, FIG. 2B)

PATENT REFERENCE 2: Japanese Patent Application Publication No. 5-332737 (pages. 3-5, FIG. 1)

SUMMARY OF THE INVENTION

Problem to be Solved by the Invention

However, since the apparatus shown in Patent Reference 1 does not include a light projection device that emits light patterns, there is a problem in that a distance to a subject that does not have a point (a feature point) suitable for feature extraction such as an edge cannot be measured accurately.

The apparatus shown in Patent Reference 2 includes a light projection device that emits light patterns. Thus, the apparatus can measure a distance to a subject that does not have a feature point. However, the apparatus has a problem in that it cannot accurately measure a distance to a subject located at a position on which the camera cannot focus (a position where an image blur exists).

Thus, an object of the present invention is to provide a distance measurement apparatus and a distance measurement method that can accurately measure a distance to a subject regardless of the presence or absence of an image blur.

Means for Solving the Problem

A distance measurement apparatus according to an aspect of the present invention includes: a projection unit that projects a plurality of light patterns to a subject; an optical system including a mechanism that changes a focal length; an imaging unit that photographs the subject via the optical system; a control unit that makes the projection unit project the plurality of light patterns sequentially and makes the imaging unit acquire a plurality of first captured images corresponding to the plurality of light patterns when making the optical system set the focal length to a first focal length, and that makes the projection unit project the plurality of light patterns sequentially and makes the imaging unit acquire a plurality of second captured images corresponding to the plurality of light patterns when making the optical system set the focal length to a second focal length which is longer than the first focal length; a first distance measurement unit that determines presence or absence of an image blur per pixel from the plurality of first captured images and the plurality of second captured images and acquires a first distance, which is a distance to the subject, per pixel, from an image blur index value indicating an extent of the image blur; a second distance measurement unit that acquires a second distance, which is a distance to the subject, per pixel, based on triangulation from the plurality of first captured images and the plurality of second captured images; and a measurement result synthesis unit that outputs the first distance for a pixel determined by the first distance measurement unit to be a pixel with the image blur and that outputs the second distance for a pixel determined to be a pixel with no image blur.

A distance measurement method according to another aspect of the present invention is the method performed by an apparatus including a projection unit that projects a plurality of light patterns to a subject, an optical system including a mechanism that changes a focal length, and an imaging unit that photographs the subject via the optical system, and includes: a step of making the projection unit project the plurality of light patterns sequentially and making the imaging unit acquire a plurality of first captured images corresponding to the plurality of light patterns when the focal length of the optical system is set to a first focal length; a step of making the projection unit project the plurality of light patterns sequentially and making the imaging unit acquire a plurality of second captured images corresponding to the plurality of light patterns when the focal length of the optical system is set to a second focal length longer than the first focal length; a step of determining presence or absence of an image blur per pixel from the plurality of first captured images and the plurality of second captured images and acquiring a first distance, which is a distance to the subject, per pixel, from an image blur index value indicating an extent of the image blur; a step of acquiring a second distance, which is a distance to the subject, per pixel, based on triangulation from the plurality of first captured images and the plurality of second captured images; and a step of outputting the first distance for a pixel determined to be a pixel with the image blur in the step of acquiring the first distance, and outputting the second distance for a pixel determined to be a pixel with no image blur.

Effects of the Invention

According to the present invention, a distance to a subject can be measured accurately regardless of the presence or absence of an image blur.

BRIEF DESCRIPTION OF THE DRAWINGS

FIG. 5 is a diagram illustrating, in a table format, an image blur presence/absence flag and an image blur index value flag outputted by a first distance measurement unit illustrated in FIG. 1 with regard to a combination of a first determination result obtained when a focal length of the optical system is set to a near position (a first position) and a second determination result obtained when the focal length of the optical system is set to a far position (a second position).

FIGS. 6(A) and 6(B) are diagrams illustrating examples of LUTs as data used by the first distance measurement unit illustrated in FIG. 1 for obtaining a subject distance from the image blur index value.

MODE FOR CARRYING OUT THE INVENTION

1. First Embodiment 1-1. Configuration

Figure 1:
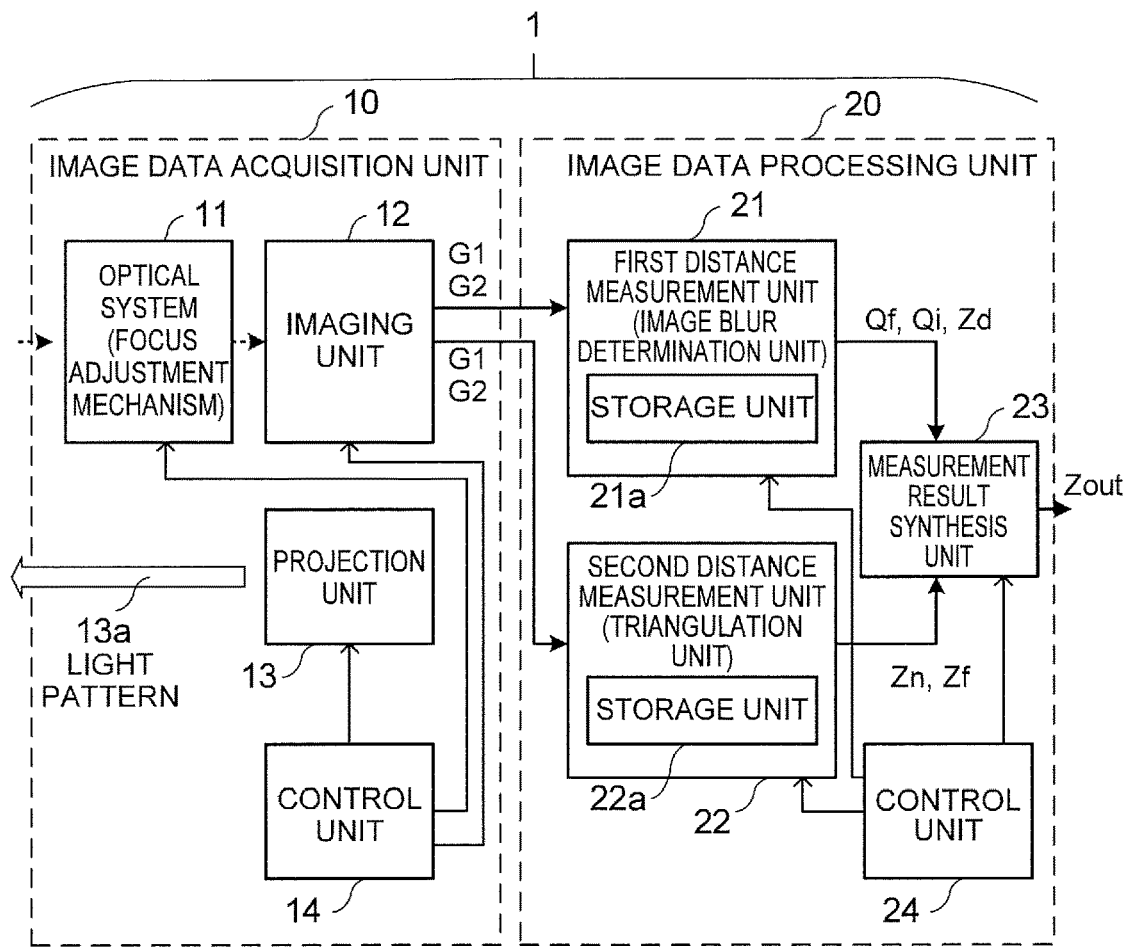
FIG. 1 is a block diagram illustrating a schematic configuration of a distance measurement apparatus according to a first embodiment of the present invention.

FIG. 1 is a block diagram illustrating a schematic configuration of a distance measurement apparatus 1 according to a first embodiment of the present invention. The distance measurement apparatus 1 is an apparatus that can perform a distance measurement method according to the first embodiment. As illustrated in FIG. 1, the distance measurement apparatus 1 includes, as main components, an image data acquisition unit (a camera and a light projection device) 10 that acquires a captured image (image data) obtained by photographing a subject (an object) and an image data processing unit 20 that obtains a distance (a subject distance) to the subject by using the image data (for example, a luminance value of each pixel in the captured image) acquired by the image data acquisition unit 10 and outputs distance data Zout indicating the obtained distance (for example, distance data per pixel). The image data processing unit 20 may include a display unit (a liquid crystal display unit) for displaying the distance data Zout as a numerical value or a map indicating the distance data and an operation unit for user operations.

As illustrated in FIG. 1, the image data acquisition unit 10 includes: an optical system 11 including an optical member such as a lens or a group of lenses and a mechanism that changes a focal length (focal position); an imaging unit 12 that photographs the subject via the optical system 11 (for example, via the lens); and a projection unit 13, which is a light projection device that projects (emits) a plurality of light patterns to the subject existing inside an imaging space. The optical system 11 may include a diaphragm adjustment mechanism that adjusts a diaphragm. In addition, the image data acquisition unit 10 includes a control unit 14 that comprehensively controls the image data acquisition unit 10 (the optical system 11, the imaging unit 12, and the projection unit 13 in the first embodiment).

Figure 3:
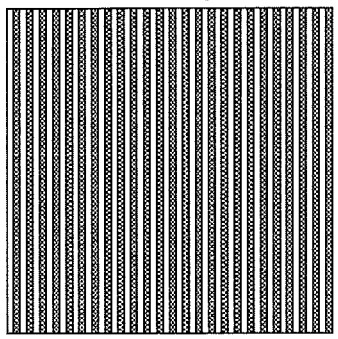
FIGS. 3(A1), 3(A2), 3(B1), 3(B2), 3(C1), 3(C2), 3(D1), 3(D2), 3(E1), 3(E2), 3(F1) and 3(F2) are diagrams illustrating examples of 12 kinds of light patterns projected by the projection unit illustrated in FIG. 1.
Figure 3:
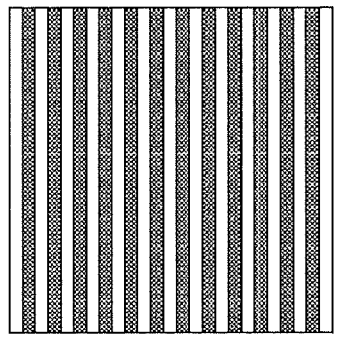
Figure 3:
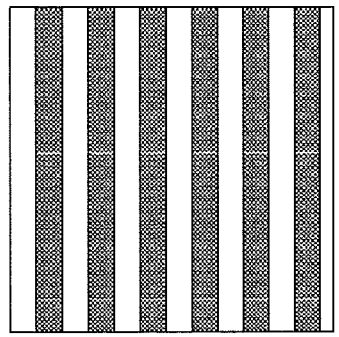
Figure 3:
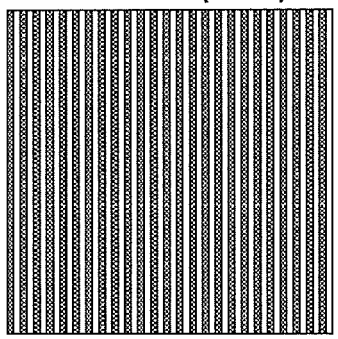
Figure 3:
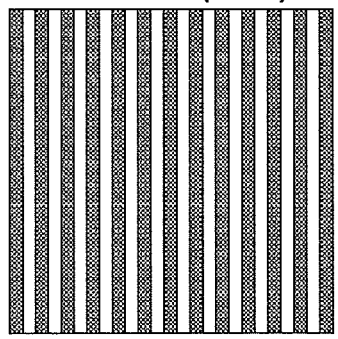
Figure 3:
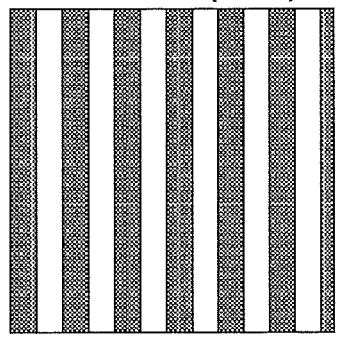
Figure 3:
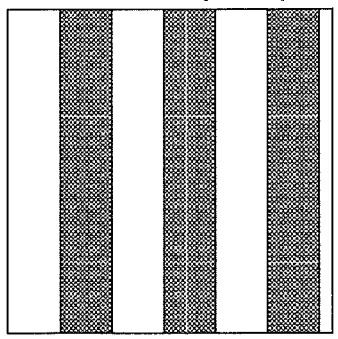
Figure 3:
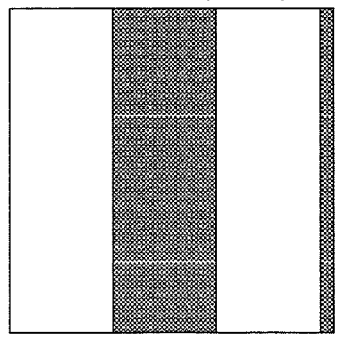
Figure 3:
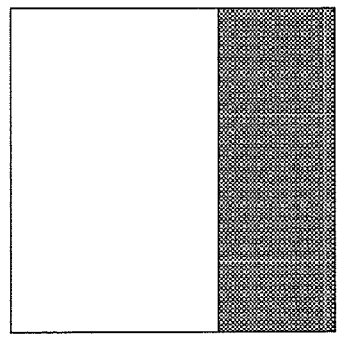
Figure 3:
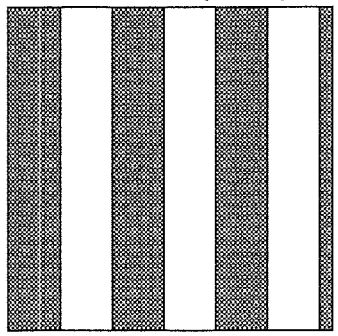
Figure 3:
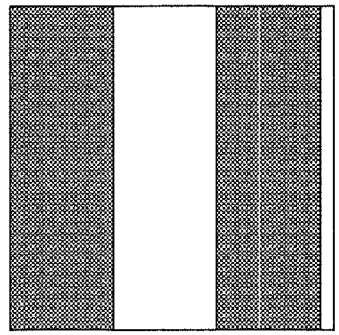
Figure 3:
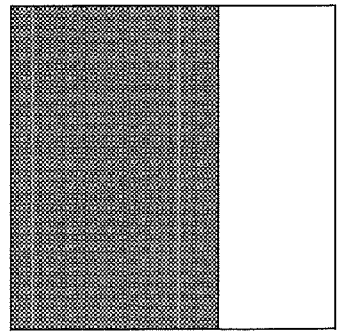

The control unit 14 makes the optical system 11 set the focal length to a first focal length f1 (a short focal length, i.e., a focal position near the imaging unit 12). In this state, the control unit 14 makes the projection unit 13 project a plurality of light patterns sequentially and makes the imaging unit 12 acquire a plurality of first captured images G1 corresponding to the plurality of light patterns. Examples of the plurality of light patterns are illustrated in FIGS. 3(A1), 3(A2), 3(B1), 3(B2), 3(C1), 3(C2), 3(D1), 3(D2), 3(E1), 3(E2), 3(F1) and 3(F2), which will be described below. The plurality of first captured images G1 corresponding to the plurality of light patterns may be also denoted by $G1_{A1}$, $G1_{A2}$, $G1_{B1}$, $G1_{B2}$, $G1_{C1}$, $G1_{C2}$, $G1_{D1}$, $G1_{D2}$, $G1_{E1}$, $G1_{E2}$, $G1_{F1}$, and $G1_{F2}$.

In addition, the control unit 14 makes the optical system 11 set the focal length to a second focal length f2 (a long focal length, i.e., a focal position far from the imaging unit 12) longer than the first focal length f1. In this state, the control unit 14 makes the projection unit 13 project the plurality of light patterns sequentially and makes the imaging unit 12 acquire a plurality of second captured images G2 corresponding to the plurality of light patterns. Examples of the plurality of light patterns are illustrated in FIGS. 3(A1), 3(A2), 3(B1), 3(B2), 3(C1), 3(C2), 3(D1), 3(D2), 3(E1), 3(E2), 3(F1), and 3(F2), which will be described below. The plurality of second captured images G2 corresponding to the plurality of light patterns are also denoted by $G2_{A1}$, $G2_{A2}$, $G2_{B1}$, $G2_{B2}$, $G2_{C1}$, $G2_{C2}$, $G2_{D1}$, $G2_{D2}$, $G2_{E1}$, $G2_{E2}$, $G2_{F1}$, and $G2_{F2}$.

As illustrated in FIG. 1, the image data processing unit 20 includes a first distance measurement unit (an image blur determination unit) 21, a second distance measurement unit (a triangulation unit) 22, a measurement result synthesis unit 23, and a control unit 24. The first distance measurement unit 21 may include a storage unit 21a such as a memory in which information is stored. The second distance measurement unit 22 may include a storage unit 22a such as a memory in which information is stored. The storage unit 21a may be provided outside the first distance measurement unit 21. The storage unit 22a may be provided outside the second distance measurement unit 22. The storage units 21a and 22a may be different areas in the same memory.

The first distance measurement unit 21 determines the presence or absence of an image blur per pixel from the plurality of first captured images G1 and the plurality of second captured images G2 which have been received from the imaging unit 12 and outputs an image blur presence/absence flag Qf indicating a result of the determination. The first distance measurement unit 21 outputs an image blur index value flag Qi indicating an extent of the image blur. In addition, the first distance measurement unit 21 acquires, from an image blur index value If, a first distance Zd, which is a distance to the subject, per pixel, and outputs the first distance Zd.

The second distance measurement unit 22 acquires second distances Zn and Zf, each of which is a distance to the subject per pixel calculated based on triangulation, from the plurality of first captured images G1 and the plurality of second captured images G2 which have been received from the imaging unit 12. The second distance Zn is a distance calculated based on triangulation from the plurality of first captured images G1 when the focal length of the optical system 11 is set to the first focal length f1 (focal position near the optical system 11). The second distance Zf is a distance calculated based on triangulation from the plurality of second captured images G2 when the focal length of the optical system 11 is set to the second focal length f2 (focal position far from the optical system 11).

The measurement result synthesis unit 23 outputs the first distance Zd as an output value Zout for a pixel determined to be a pixel with the image blur (Qf=1) by the first distance measurement unit 21 and outputs the second distance Zf or Zn as the output value Zout for a pixel determined to be a pixel with no image blur (Qf=0) by the first distance measurement unit 21. The measurement result synthesis unit 23 outputs data indicating an error as the output value Zout for a pixel (Qf=−1) in which a determination result by the first distance measurement unit 21 is the error.

Figure 2:
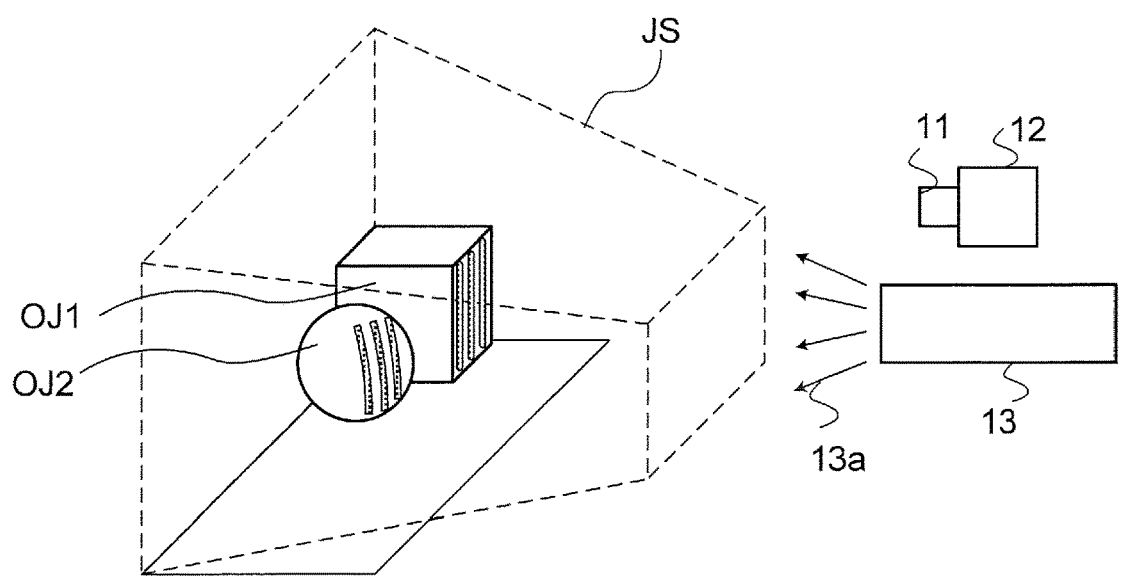
FIG. 2 is a diagram schematically illustrating an arrangement of an optical system, an imaging unit and a projection unit illustrated in FIG. 1.

FIG. 2 is a diagram schematically illustrating an arrangement of the optical system 11, the imaging unit 12, and the projection unit 13 in FIG. 1. As illustrated in FIG. 2, in the image data acquisition unit 10 of the distance measurement apparatus 1, the projection unit 13 projects the light patterns 13a to the subjects OJ1 and OJ2 in the imaging space JS, and each of the light pattern 13a is formed by stripes of bright areas (areas illuminated with light from the projection unit 13) and stripes of dark areas (areas that are not illuminated with light from the projection unit 13) which are darker than the bright areas, the stripes of bright areas and the stripes of dark areas being arranged alternately (i.e., each of the light pattern 13a is formed by the stripes of bright areas and the stripes of dark areas). The imaging unit 12 photographs the subjects OJ1 and OJ2 to which the light pattern 13a is projected via the optical system 11.

FIGS. 3(A1), 3(A2), 3(B1), 3(B2), 3(C1), 3(C2), 3(D1), 3(D2), 3(E1), 3(E2), 3(F1) and 3(F2) illustrate examples of 12 kinds of the light patterns 13a projected by the projection unit 13 illustrated in FIG. 1, namely, examples of the light patterns in which the stripes of bright areas (shaded areas in FIG. 3) and the stripes of dark areas (white areas in FIG. 3) are alternately arranged in the direction of the arrangement (in the horizontal direction in FIG. 3). The examples of the light patterns 13a are not limited to the illustrated examples, and the number of kinds of the light pattern 13a is not limited to 12.

FIGS. 3(A1) and 3(A2) illustrate light patterns in which the width of the stripe of bright area is the narrowest in the direction of the arrangement. The width of the stripe in the light patterns in FIGS. 3(B1) and 3(B2) is twice as wide as the width of the stripe in the light patterns in FIGS. 3(A1) and 3(A2). The width of the stripe in the light patterns in FIGS. 3(C1) and 3(C2) is twice as wide as the width of the stripe in the light patterns in FIGS. 3(B1) and 3(B2). The width of the stripe in the light patterns in FIGS. 3(D1) and 3(D2) is twice as wide as the width of the stripe in the light patterns in FIGS. 3(C1) and 3(C2). The width of the stripe in the light patterns in FIGS. 3(E1) and 3(E2) is twice as wide as the width of the stripe in the light patterns in FIGS. 3(D1) and 3(D2). The width of the stripe in the light patterns in FIGS. 3(F1) and 3(F2) is twice as wide as the width of the stripe in the light patterns in FIGS. 3(E1) and 3(E2).

The light pattern in FIG. 3(A2) is obtained by interchanging (inverting) the stripes of bright areas and the stripes of dark areas in the light pattern in FIG. 3(A1). The light pattern in FIG. 3(B2) is obtained by interchanging (inverting) the stripes of bright areas with the stripes of dark areas in the light pattern in FIG. 3(B1). The light pattern in FIG. 3(C2) is obtained by interchanging (inverting) the stripes of bright areas and the stripes of dark areas in the light pattern in FIG. 3(C1). The light pattern in FIG. 3(D2) is obtained by interchanging (inverting) the stripes of bright areas and the stripes of dark areas in the light pattern in FIG. 3(D1). The light pattern in FIG. 3(E2) is obtained by interchanging (inverting) the stripes of bright areas and the stripes of dark areas in the light pattern in FIG. 3(E1). The light pattern in FIG. 3(F2) is obtained by interchanging (inverting) the stripes of bright areas and the stripes of dark areas in the light pattern in FIG. 3(F1).

1-2. Operation

The control unit 14 makes the optical system 11 set the focal length to the first focal length (the short focal length, i.e., the focal position near the imaging unit 12) f1. In this state, the control unit 14 makes the projection unit 13 project the plurality of light patterns sequentially and makes the imaging unit 12 acquire the plurality of first captured images G1 corresponding to the plurality of light patterns. The examples of the plurality of light patterns are illustrated in FIGS. 3(A1), 3(A2), 3(B1), 3(B2), 3(C1), 3(C2), 3(D1), 3(D2), 3(E1), 3(E2), 3(F1) and 3(F2).

In addition, the control unit 14 makes the optical system 11 set the focal length to the second focal length f2 (the long focal length, i.e., the focal position far from the imaging unit 12) longer than the first focal length f1. In this state, the control unit 14 makes the projection unit 13 project the plurality of light patterns sequentially and makes the imaging unit 12 acquire the plurality of second captured images G2 corresponding to the plurality of light patterns. The examples of the plurality of light patterns are illustrated in FIGS. 3(A1), 3(A2), 3(B1), 3(B2), 3(C1), 3(C2), 3(D1), 3(D2), 3(E1), 3(E2), 3(F1) and 3(F2).

In this way, in the first embodiment, the control unit 14 performs control for making the optical system 11 set one of the two kinds of focal lengths (focal positions) f1 and f2, control for making the projection unit 13 project the plurality of kinds of light patterns sequentially and control of the shutter operation of the imaging unit 12 in synchronization with switching of the kinds of the light patterns (i.e., control of the photographing timing), and thereby the image data acquisition unit 10 photographs an image when the light pattern is projected with regard to each of the plurality of light patterns. Since the distance measurement apparatus 1 according to the first embodiment photographs images for the 12 kinds of patterns with regard to the two kinds of focal positions, the distance measurement apparatus 1 obtains the subject distance per pixel from a total of 24 captured images.

Figure 4A:
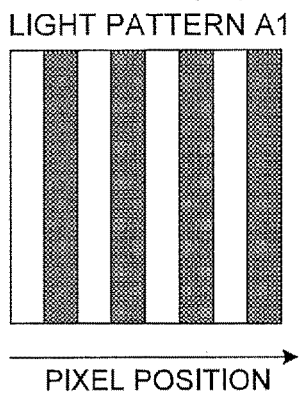
FIGS. 4(A) and 4(B) are diagrams each illustrating a light pattern having stripes of bright areas and stripes of dark areas, these light patterns having an opposite arrangement sequence to each other.
Figure 4B:
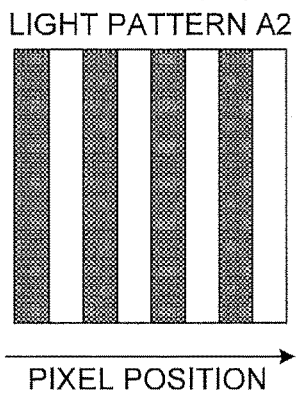
Figure 4C:
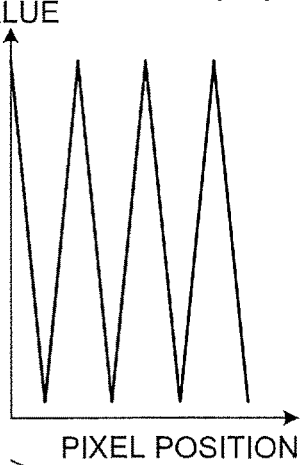
FIGS. 4(C) and 4(D) are diagrams illustrating pixel values of captured images obtained by photographing an object to which the light patterns in FIGS. 4(A) and 4(B) are projected (when there is no image blur)
Figure 4D:
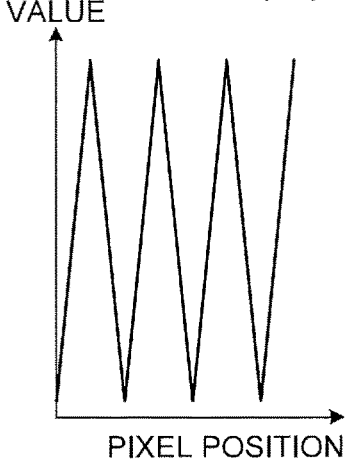
Figure 4E:
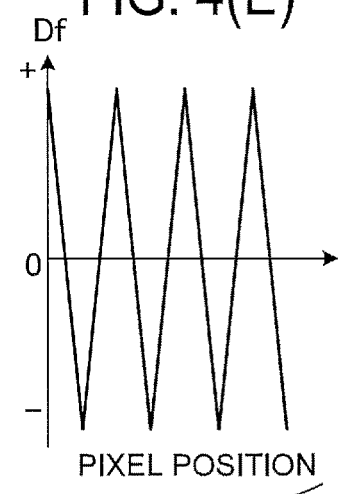
FIG. 4(E) is a diagram illustrating a pixel value difference between FIGS. 4(C) and 4(D)
Figure 4F:
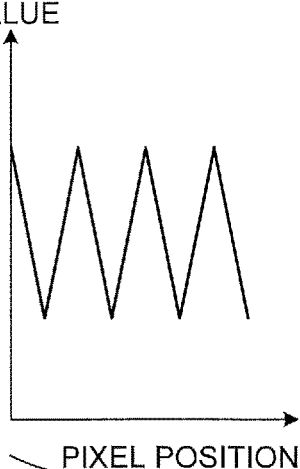
FIGS. 4(F) and 4(G) are diagrams illustrating pixel values of the captured images obtained by photographing the object to which the light patterns in FIGS. 4(A) and 4(B) are projected (when there is an image blur)
Figure 4G:
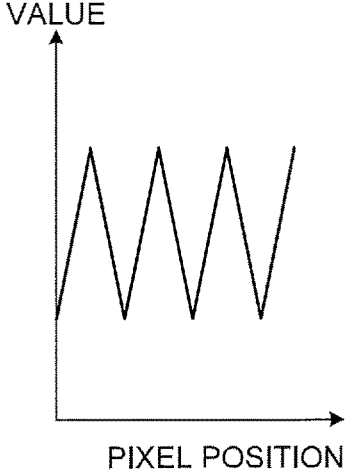
Figure 4H:
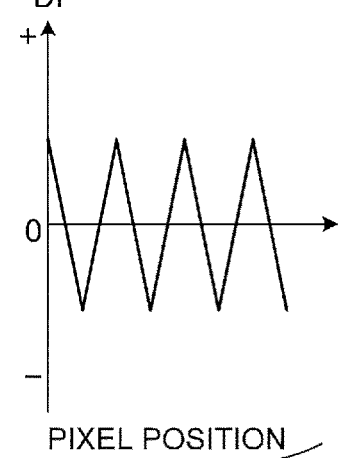
FIG. 4(H) is a diagram illustrating a pixel value difference between FIGS. 4(F) and 4(G).

FIGS. 4(A) and 4(B) are diagrams each illustrating the light pattern having the stripes of bright areas and stripes of dark areas, these light patterns having an opposite arrangement sequence to each other. FIGS. 4(C) and 4(D) are diagrams illustrating pixel values of the captured images obtained by photographing the object to which the light patterns in FIGS. 4(A) and 4(B) are projected (when the image blur is absent), and FIG. 4(E) is a diagram illustrating a difference Df between the pixel values in FIGS. 4(C) and 4(D). FIGS. 4(F) and 4(G) are diagrams illustrating pixel values of the captured images obtained by photographing the object to which the light patterns in FIGS. 4(A) and 4(B) are projected (when the image blur is present), and FIG. 4(H) is a diagram illustrating a difference Df between the pixel values in FIGS. 4(F) and 4(G).

On the basis of the pixel value difference Df, which is the difference between the captured images corresponding to a pair of light patterns in which bright areas and dark areas are inverted, the first distance measurement unit 21 determines whether or not there is the image blur in the captured image per local area including a target pixel. The light pattern used for this determination is the light pattern in which the width of each stripe is the narrowest, for example, that is, the light patterns in FIG. 3(A1) and FIG. 3(A2) are used for the determination in a case where the patterns in FIGS. 3(A1), 3(A2) to FIGS. 3(F1), 3(F2) are used. The first distance measurement unit 21 performs the processing with respect to each of the images photographed with the two kinds of focal positions f1 and f2.

Since the brightness on the subject to which the light pattern is projected (the brightness of the pattern) varies according to the reflectance of the subject, an image blur index value normalized by a pixel value is calculated per pixel. Pixel values at a certain (arbitrary) pixel position R are denoted by P(A1) and P(A2). P(A1) indicates the pixel value at the pixel position R when the light pattern A1 (illustrated in FIG. 3(A1)) is projected, and P(A2) indicates the pixel value at the same pixel position R when the light pattern A2 (illustrated in FIG. 3(A2)) is projected. Df indicates the normalized pixel value difference Df at the same pixel position R. The pixel value difference Df at the pixel position R is represented by expression (1), and an average pixel value Sf at the pixel position R is represented by expression (2).

$$Df = (P(A1) - P(A2)) / \{(P(A1) + P(A2))/2\} \quad (1)$$

$$Sf = (P(A1) + P(A2))/2 \quad (2)$$

When an image blur index value If with respect to a certain target pixel is calculated, the difference between a maximum value Dfmax and a minimum value Dfmin (Dfmax−Dfmin) of the normalized pixel value difference Df in the vicinity of the target pixel (for example, a range included in a rectangle of 5 pixels in height and 5 pixels in width with the target pixel at the center) is determined as the image blur index value If. Namely, the image blur index value If is represented by the following expression (3).

$$If = Df\text{max} - Df\text{min} \quad (3)$$

In addition, an average value of the average pixel values Sf of target pixels near a target pixel is denoted by Sf_avg.

In a case where the average pixel value Sf_avg near a target pixel is smaller than a predetermined average pixel value threshold Ta (Sf_avg<Ta) (i.e., in a case where an area of the stripe of bright area in the light pattern is not sufficiently bright), the first distance measurement unit 21 regards the luminance of the image at the target pixel position as insufficient, determines that it is an error and thus terminates the processing.

In a case where the images have no image blur as illustrated in FIGS. 4(C), 4(D) and 4(E), the pixel value difference Df between the two images fluctuates more largely, compared with a case where the images have the image blur as illustrated in FIGS. 4(F), 4(G) and 4(H). Thus, the image blur index value If increases. Namely, the larger the image blur index value If is, the smaller the image blur is. The smaller the image blur index value If is, the larger the image blur is.

Thus, when the average pixel value Sf_avg near the target pixel is equal to or more than the average pixel value threshold Ta (Sf_avg≥Ta), if the image blur index value If is larger than a predetermined image blur determination threshold Tf (If>Tf), the first distance measurement unit 21 determines that there is no image blur at the target pixel position. In contrast, when Sf_avg≥Ta, if the image blur index value If is equal to or less than the image blur determination threshold Tf (If≤Tf), the first distance measurement unit 21 determines that there is the image blur.

When obtaining the image blur index value If, since there is a possibility that an error (a noise component) of the normalized pixel value difference Df is large due to a noise or the like of the original image, the first distance measurement unit 21 may adopt a method of calculating the image blur index value If from the difference between the n-th largest pixel value and the n-th smallest pixel value (n=2, 3, 4, . . . ), instead of calculating the image blur index value If from the maximum value and the minimum value of the pixel value difference Df.

FIG. 5 is a diagram illustrating, in a table format, information (the image blur presence/absence flag Qf and the image blur index value flag Qi) outputted by the first distance measurement unit 21 according to a combination of a determination result obtained when the focal length of the optical system 11 is set to a first focal position (the short first focal length f1), which is a near position, and a determination result obtained when the focal length of the optical system 11 is set to a second focal position (the second focal length f2 longer than the first focal length f1), which is a far position.

The first distance measurement unit 21 performs image blur determination processing for checking the presence or absence of the image blur after projection of light patterns to the subject, with regard to an image obtained when the focal length is set to the first focal position (the first focal length f1) near the optical system 11 (first setting) and an image obtained when the focal length is set to the second focal position (the second focal length f2) far from the optical system 11 (second setting). Namely, the first distance measurement unit 21 makes the determination with regard to the images when the first and second settings are made. The first distance measurement unit 21 makes final determination on the combination of images according to a combination of the determination results obtained by using the two kinds of focal positions.

The first distance measurement unit 21 outputs the image blur presence/absence flag Qf, the image blur index value flag Qi, and the subject distance Zd based on an image blur amount, according to the combination of the determination results obtained by using the two kinds of focal positions. Qf=1 represents the "presence of the image blur". Qf=0 represents the "absence of the image blur". Qf=−1 represents an "error". FIG. 5 illustrates output values of the image blur presence/absence flag Qf and the image blur index value flag Qi corresponding to the combination of two kinds of determination result. Regarding an item written as "Qi=*" in FIG. 5, the value is determined on the basis of the magnitude relationship between the image blur index values If (Ifn and Iff).

Regarding the item written as "Qi=*" in FIG. 5, when the image blur index value If of the image obtained when the focal position is nearer (the first focal length f1) of the two kinds of focal positions is denoted by Ifn and the image blur index value If of the image obtained when the focal length is farther (the second focal length f2) of the two kinds of focal positions is denoted by Iff, if Ifn>Iff (if the image blur of the image obtained when the focal length is nearer is smaller), Qi=1 is set, and if Ifn Iff (if the image blur of the image obtained when the focal length is farther is smaller), Qi=0 is set.

In addition, when Qf=1 (when there is the image blur), a value corresponding to the distance measurement result based on the image blur amount as will be described below is set as the subject distance Zd. When Qf≠1 (i.e., when Qf=0 or when Qf=−1), Zd=0 is set.

When it is determined that there is the image blur on the basis of the combination of determination results obtained by using the two kinds of focal positions, namely, when Qf=1 (there is the image blur) is set, measuring the distance on each pixel is continued.

FIGS. 6(A) and 6(B) are diagrams illustrating examples of look-up tables (LUTs) as data used by the first distance measurement unit 21 illustrated in FIG. 1 to obtain the subject distance from the image blur index value If. For example, these LUTs are previously stored in the storage unit 21a of the first distance measurement unit 21.

When Ifn>Iff (when the image blur of the image obtained when the focal length is nearer is smaller), namely, when the image blur index value Ifn of the image obtained when the focal length is nearer is larger than the image blur index value Iff of the image obtained when the focal length is farther, the first distance measurement unit 21 performs distance measurement, assuming that the subject exists where the focal length is nearer. By referring to the LUT (FIG. 6(A)) used when the subject exists on the near side, the subject distance is obtained from the image blur index value Ifn.

When Ifn≤Iff (when the image blur of the image obtained when the focal length is farther is smaller), namely, when the image blur index value Ifn of the image obtained when the focal length is nearer is equal to or less than the image blur index value Iff of the image obtained when the focal length is farther, the first distance measurement unit 21 performs distance measurement, assuming that the subject exists where the focal length is farther. By referring to the LUT (FIG. 6(B)) used when the subject exists on the far side, the subject distance is obtained from a value of the image blur index value Iff.

The first distance measurement unit 21 outputs the distance obtained by using the LUT as the distance Zd.

Figure 7:
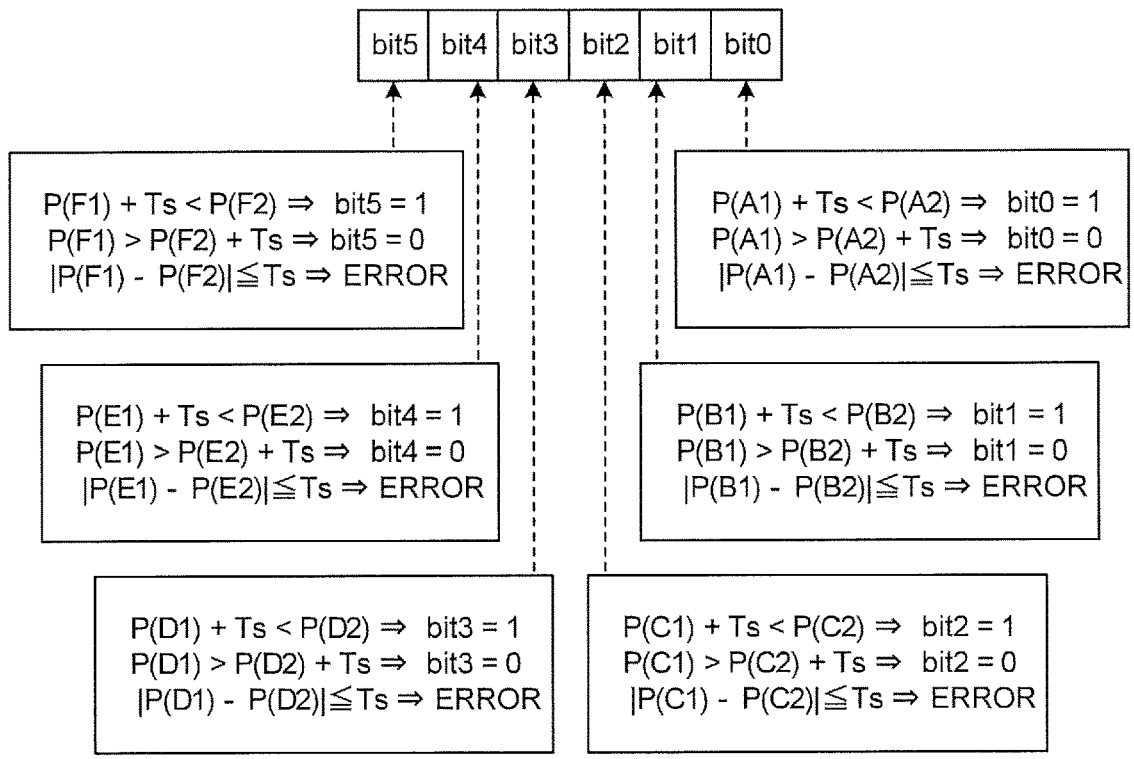
FIG. 7 is a diagram illustrating a method for calculating position numbers of the stripes forming a light pattern, the position numbers being used to indicate positions on a subject to which the light pattern is projected (position numbers of the stripes of bright areas and the strips of dark areas in FIGS. 3(A1) and 3(A2)).
Figure 8:
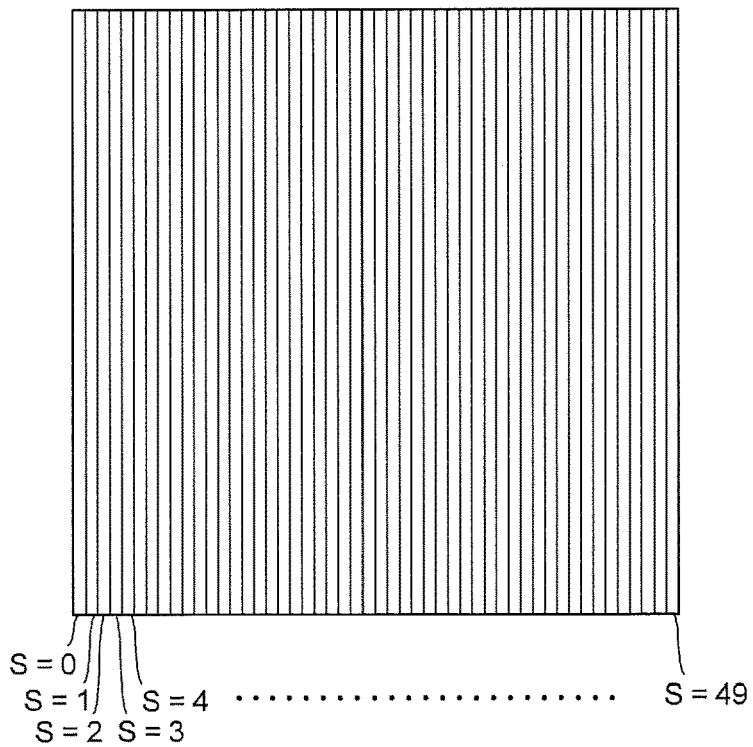
FIG. 8 is a diagram illustrating a relationship between the positions on the subject to which light patterns are projected and the position numbers of stripes that form the light patterns (position numbers of the stripes of bright areas and stripes of dark areas in FIGS. 3(A1) and 3(A2)).

FIG. 7 is a diagram illustrating a method for calculating position numbers S of the stripes forming the light pattern, the position numbers being used to indicate positions on the subject to which the light pattern is projected (position numbers of the stripes of bright areas and the stripes of dark areas in FIGS. 3(A1) and 3(A2)). FIG. 8 is a diagram illustrating a relationship between the positions on the subject to which light patterns are projected and the position numbers S of stripes that form the light patterns (position numbers of the stripes of bright areas and stripes of dark areas in FIGS. 3(A1) and (A2)).

On the basis of the difference between the captured images corresponding to a pair of light patterns in which bright areas and dark areas are inverted, the second distance measurement unit (triangulation unit) 22 determines the positions of the patterns projected on the captured images and measures the distance to the subject on the basis of the principle of triangulation.

The pixel values of a target pixel in the captured images obtained when the light patterns in FIGS. 3(A1), 3(A1) to 3(F1), 3(F2) are projected are denoted by P(A1), P(A2), P(B1), P(B2), P(C1), P(C2), P(D1), P(D2), P(E1), P(E2), P(F1) and P(F2).

On the basis of the relationship between the pixel values P(A1) and P(A2), the second distance measurement unit 22 determines a value of bit0 of the pattern position number S. The second distance measurement unit 22 represents the pattern position number as S (a 6-bit value) and uses a predetermined threshold Ts. If P(A1)+Ts<P(A2), the second distance measurement unit 22 assigns 1 to bit0 of the pattern position number S. If P(A1)>P(A2)+Ts, the second distance measurement unit 22 assigns 0 to bit0 of the pattern position number S. If |P(A1)−P(A2)|≤Ts, the second distance measurement unit 22 determines that an error occurs and sets a value indicating the error as the pattern position number S. If an error occurs, the processing can be terminated.

Likewise, on the basis of the relationship between P(B1) and P(B2), the second distance measurement unit 22 determines a value of bit1 of the pattern position number S. If P(B1)+Ts<P(B2), the second distance measurement unit 22 assigns 1 to bit1 of the pattern position number S. If P(B1)>P(B2)+Ts, the second distance measurement unit 22 assigns 0 to bit1 of the pattern position number S. If |P(B1)−P(B2)|≤Ts, the second distance measurement unit 22 determines that an error occurs and sets a value indicating the error as the pattern position number S. If an error occurs, the processing can be terminated.

Likewise, on the relationship between P(C1) and P(C2), the second distance measurement unit 22 determines a value of bit2 of the pattern position number S. If P(C1)+Ts<P(C2), the second distance measurement unit 22 assigns 1 to bit2 of the pattern position number S. If P(C1)>P(C2)+Ts, the second distance measurement unit 22 assigns 0 to bit2 of the pattern position number S. If |P(C1)−P(C2)|≤Ts, the second distance measurement unit 22 determines that an error occurs and sets a value indicating the error as the pattern position number S. If an error occurs, the processing can be terminated.

Likewise, on the basis of the relationship between P(D1) and P(D2), the second distance measurement unit 22 determines a value of bit3 of the pattern position number S. If P(D1)+Ts<P(D2), the second distance measurement unit 22 assigns 1 to bit3 of the pattern position number S. If P(D1)>P(D2)+Ts, the second distance measurement unit 22 assigns 0 to bit3 of the pattern position number S. If |P(D1)−P(D2)|≤Ts, the second distance measurement unit 22 determines that an error occurs and sets a value indicating the error as the pattern position number S. If an error occurs, the processing can be terminated.

Likewise, on the basis of the relationship between P(E1) and P(E2), the second distance measurement unit 22 determines a value of bit4 of the pattern position number S. If P(E1)+Ts<P(E2), the second distance measurement unit 22 assigns 1 to bit4 of the pattern position number S. If P(E1)>P(E2)+Ts, the second distance measurement unit 22 assigns 0 to bit4 of the pattern position number S. If |P(E1)−P(E2)|≤Ts, the second distance measurement unit 22 determines that an error occurs and sets a value indicating the error as the pattern position number S. If an error occurs, the processing can be terminated.

Likewise, on the basis of the relationship between P(F1) and P(F2), the second distance measurement unit 22 determines a value of bit5 of the pattern position number S. If P(F1)+Ts<P(F2), the second distance measurement unit 22 assigns 1 to bit5 of the pattern position number S. If P(F1)>P(F2)+Ts, the second distance measurement unit 22 assigns 0 to bit5 of the pattern position number S. If |P(F1)−P(F2)|≤Ts, the second distance measurement unit 22 determines that an error occurs and sets a value indicating the error as the pattern position number S. If an error occurs, the processing can be terminated.

Through the above processing, a unique value corresponding to a position on the pattern is set as the pattern position number S.

Figure 9:
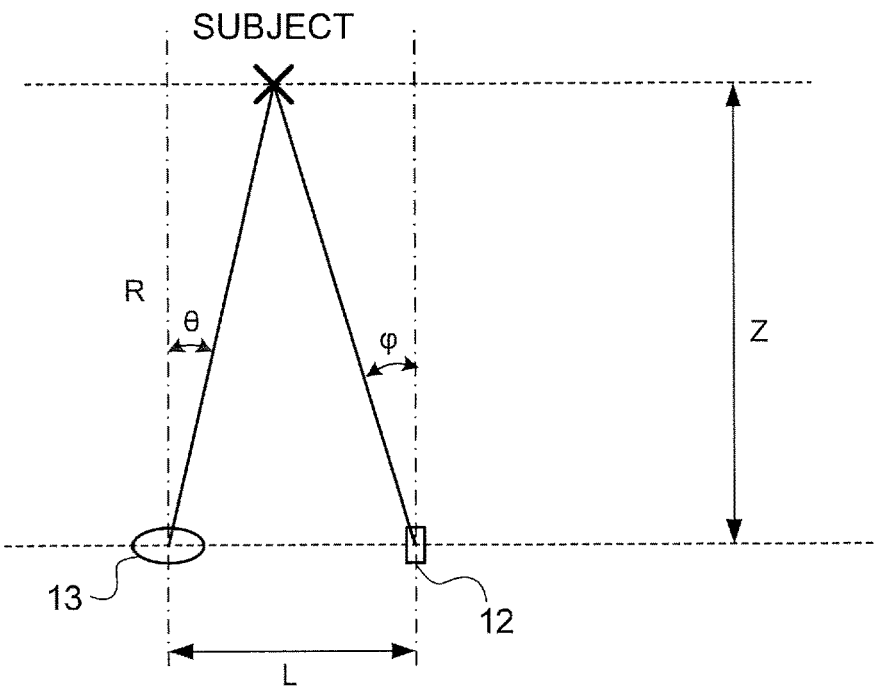
FIG. 9 is a diagram illustrating a distance measurement method performed by the second distance measurement unit illustrated in FIG. 1 on the basis of a position relationship among the projection unit, the imaging unit and the subject.

FIG. 9 is a diagram illustrating a distance measurement method performed by the second distance measurement unit 22 illustrated in FIG. 1 on the basis of a position relationship among the projection unit 13, the imaging unit 12, and the subject. In FIG. 9, an angle θ can be calculated on the basis of the previously obtained pattern position number S. Specifically, by preparing a first look-up table (LUT), which is data for associating the pattern position number S with the angle θ, in the storage unit 22a and by referring to the first LUT, the angle θ can be obtained. In addition, in FIG. 9, an angle φ can be calculated on the basis of a position on the captured image acquired by photographing by the imaging unit 12. By preparing a second look-up table (LUT) for associating a horizontal coordinate of the subject on the image with the angle φ in the storage unit 22a and by referring to the second LUT, the angle φ is obtained. The distance z to the subject is calculated according to the following expression (4), from values of the angle θ, the angle φ, and a baseline length L.

$$z = L/(\tan\theta + \tan\varphi) \quad (4)$$

The above processing is performed with respect to images obtained with the two kinds of focal positions f1 and f2, and distances corresponding to the respective images are obtained. The distance z calculated by using the image obtained when the focal position is one of the two kinds of focal positions f1 and f2 that is near the optical system 11 (the first focal length f1) is denoted by Zn, and the distance z calculated by using the image obtained when the focal position is the other one that is far from the optical system 11 (the second focal length f2) is denoted by Zf.

Figure 10:
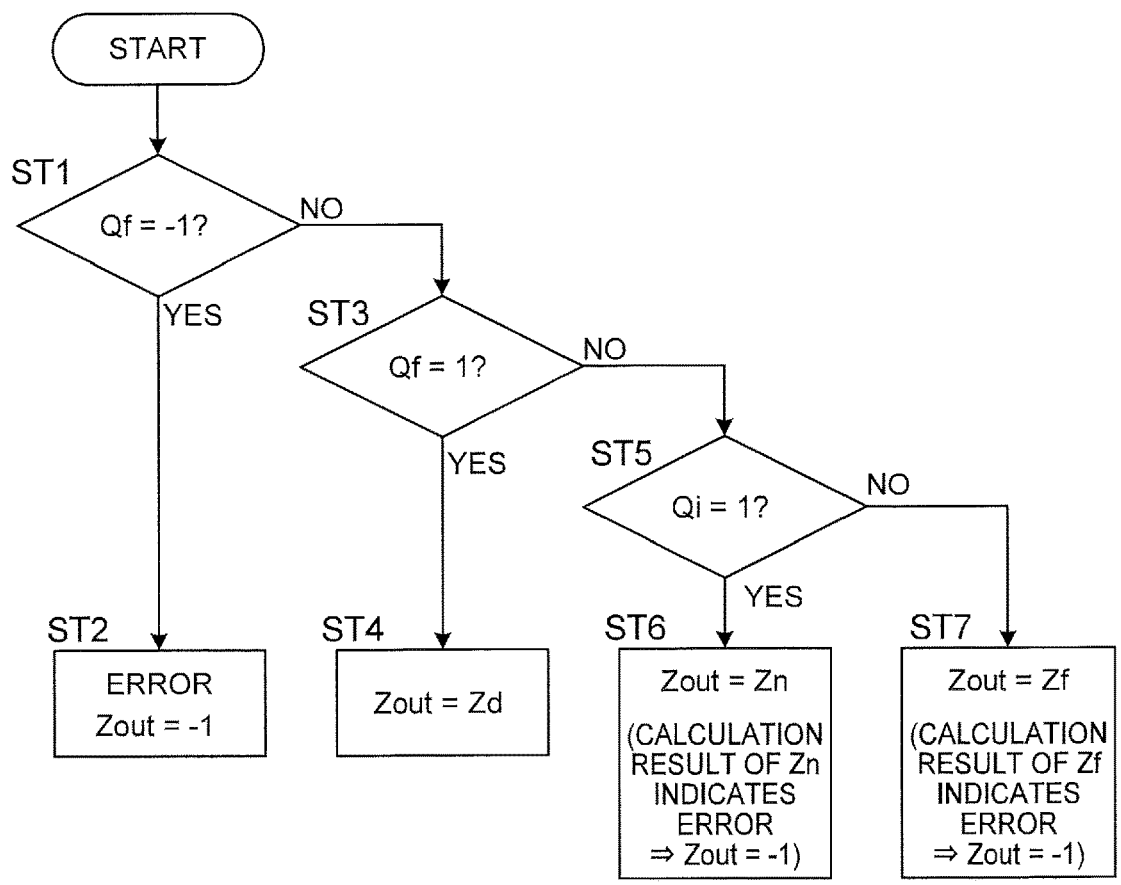
FIG. 10 is a flowchart illustrating processing of outputting a result of measurement of the subject distance by the image data processing unit illustrated in FIG. 1.

FIG. 10 is a flowchart illustrating processing performed by the measurement result synthesis unit 23 of the image data processing unit 20. The measurement result synthesis unit 23 determines the output signal Zout (a signal indicating the subject distance or a signal indicating an error) per pixel, on the basis of the image blur presence/absence flag Qf, the image blur index value flag Qi, the subject distance Zd obtained on the basis of the image blur amount, which are outputted from the first distance measurement unit 21, and the subject distances Zn and Zf indicating the two kinds of distance information calculated by the second distance measurement unit 22.

First, the measurement result synthesis unit 23 determines whether or not the image blur presence/absence flag Qf obtained from the first distance measurement unit 21 is −1 (Qf=−1), which indicates a determination error (step ST1). If Qf=−1 (YES in step ST1), the measurement result synthesis unit 23 outputs −1 (Zout=−1), which indicates a measurement error, as the output signal Zout (step ST2).

If the result of the determination in step ST1 is NO (Qf≠−1), the measurement result synthesis unit 23 determines whether or not the image blur presence/absence flag Qf obtained from the first distance measurement unit 21 is 1 (Qf=1) which indicates the presence of the image blur (step ST3). If Qf=1 (YES in step ST3), the measurement result synthesis unit 23 outputs, as the output signal Zout, the distance Zd obtained on the basis of the image blur amount (Zout=Zd) (step ST4).

If the result of the determination in step ST3 is NO (Qf≠1, the absence of the image blur), the measurement result synthesis unit 23 determines whether or not the image blur index value flag Qi obtained from the first distance measurement unit 21 is 1 (Qi=1) (if Ifn>Iff, namely, if the image blur in the image obtained when the focal length is near is smaller) (step ST5). If Qi=1 (YES in step ST5), the measurement result synthesis unit 23 outputs the distance Zn calculated by the second distance measurement unit 22 by using the image obtained when the focal length is near, as the output signal Zout (Zout=Zn) (step ST6). In step ST6, if the calculation result of the distance Zn indicates an error, the measurement result synthesis unit 23 outputs −1 as Zout (Zout=Zn=−1).

If the result of the determination in step ST5 is NO (Qi≠1) (if Ifn≤Iff, namely, if the image blur in the image obtained when the focal length is far is smaller), the measurement result synthesis unit 23 outputs the distance Zf calculated by the second distance measurement unit 22 by using the image obtained when the focal length is far, as the output signal Zout (Zout=Zf) (step ST7). In step ST7, if the calculation result of the distance Zf indicates an error, the measurement result synthesis unit 23 outputs −1 as Zout (Zout=Zf=−1).

By sequentially performing the above processing with respect to each point on the captured image as a target pixel, it is possible to acquire data on a subject distance distribution of the entire captured image (namely, a map indicating the subject distances on the entire captured image).

1-3. Effects

Through a conventional distance measurement based on triangulation, accurate distance information cannot be acquired, regarding a region with the image blur in the captured image. In contrast, according to the distance measurement apparatus 1 and the distance measurement method of the first embodiment, the distance Zd obtained on the basis of the image blur amount is output as the subject distance Zout regarding a region with the image blur, and the distance Zn or the distance Zf calculated from distance measurement based on triangulation is output as the subject distance Zout regarding a region with no image blur. Thus, according to the distance measurement apparatus 1 and the distance measurement method of the first embodiment, it is possible to accurately measure the distance to the subject regardless of the presence or absence of the image blur.

2. Second Embodiment

2-1. Configuration

The first embodiment has described the apparatus and the method that output the distance data Zout by fixing each of the projection unit 13 and the imaging unit 12 at a single position and combining distance measurement using the image blur amount and distance measurement based on triangulation. However, in a case where the subject has a complex shape (for example, in a case where the subject has a depressed portion), projection of the light pattern by the projection unit 13 fixed at the single position may produce a blind spot region which is not illuminated with the light pattern on the subject. With respect to such a region which is not illuminated with the light pattern on the subject, the subject distance cannot be accurately measured in some cases, even by using the distance measurement apparatus 1 and the method according to the first embodiment. Thus, in a second embodiment, by moving a photographing unit 10b including the projection unit 13, the optical system 11, and the imaging unit 12, changing a photographing direction of the imaging unit 12 (rotating the photographing unit 10b), and performing photographing at a plurality of photographing angles from a plurality of positions, a region not illuminated with the light pattern (region for which distance measurement is impossible) is reduced (eliminated desirably).

Figure 11:
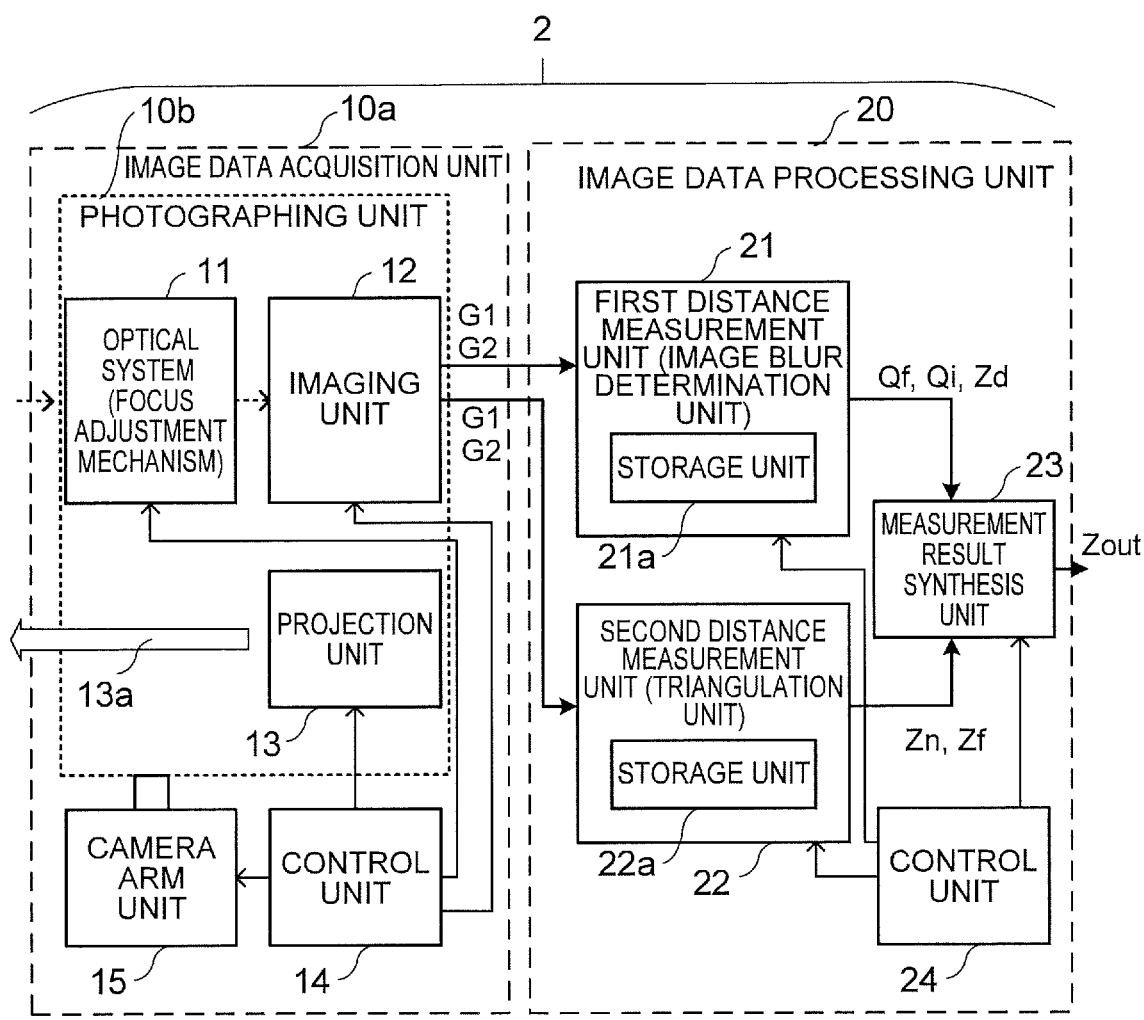
FIG. 11 is a block diagram illustrating a schematic configuration of a distance measurement apparatus according to a second embodiment of the present invention.

FIG. 11 is a block diagram illustrating a schematic configuration of a distance measurement apparatus 2 according to the second embodiment of the present invention. The distance measurement apparatus 2 is an apparatus that can perform a distance measurement method according to the second embodiment. In FIG. 11, components that are the same as or correspond to the components illustrated in FIG. 1 are denoted by the same reference characters as those in FIG. 1. As illustrated in FIG. 11, the distance measurement apparatus 2 includes a camera arm unit 15 as a moving and rotating mechanism, in addition to the optical system 11, the imaging unit 12, the projection unit 13, the control unit 14, and the image data processing unit 20. The optical system 11, the imaging unit 12, and the projection unit 13 are attached to the same supporting member, thereby forming the photographing unit (camera) 10b.

The camera arm unit 15 is an arm extending from a fixed reference position, and the photographing unit 10b according to the second embodiment is attached to an end of the camera arm unit 15. The camera arm unit 15 is controlled by the control unit 14 and is used to change the position of the photographing unit 10b with respect to the subject. The camera arm unit 15 may be either a mechanism of which position and angle can be changed by the user or a mechanism of which position and angle can be changed by a drive force generation mechanism such as a motor and a drive force transmission mechanism such as a gear.

2-2. Operation

The distance measurement apparatus 2 according to the second embodiment first performs a distance measurement (a first distance measurement) by using a combination of a distance measurement based on the image blur amount and a distance measurement based on triangulation. Next, the distance measurement apparatus 2 moves the position of the photographing unit 10b by controlling the camera arm unit 15, and performs second and subsequent distance measurements.

Although the first distance measurement using the combination of the distance measurement based on the image blur amount and the distance measurement based on triangulation may be a low-accuracy distance measurement (since the accuracy can be improved through the second and subsequent distance measurements), the same processing as the distance measurement according to the first embodiment may be adopted.

First, a method for determining the position to which the photographing unit 10b is moved on the basis of the result of the first distance measurement will be described.

Two kinds of cases are conceivable as a case that the result of a distance measurement at a certain point (pixel position) R0 is an error as the result of the first distance measurement: a case that reflected light at the point R0 is so weak that the captured image with sufficient luminance cannot be obtained (case A); and a case that the difference between luminance values is not sufficiently large with respect to images corresponding to a pair of light patterns in which bright areas and dark areas are inverted, as the result of photographing at the point R0 (case B). The case A is further classified into the following cases: a case (case A1) in which the point R0 is in a blind spot where the projected light does not reach; and a case (case A2) in which diffuse reflection hardly occurs because the reflectance of the subject is low or the subject is a substance with metallic luster and thus a component of the reflected light travelling toward the imaging unit 12 is weak even though the projected light reaches the subject.

Figure 12:
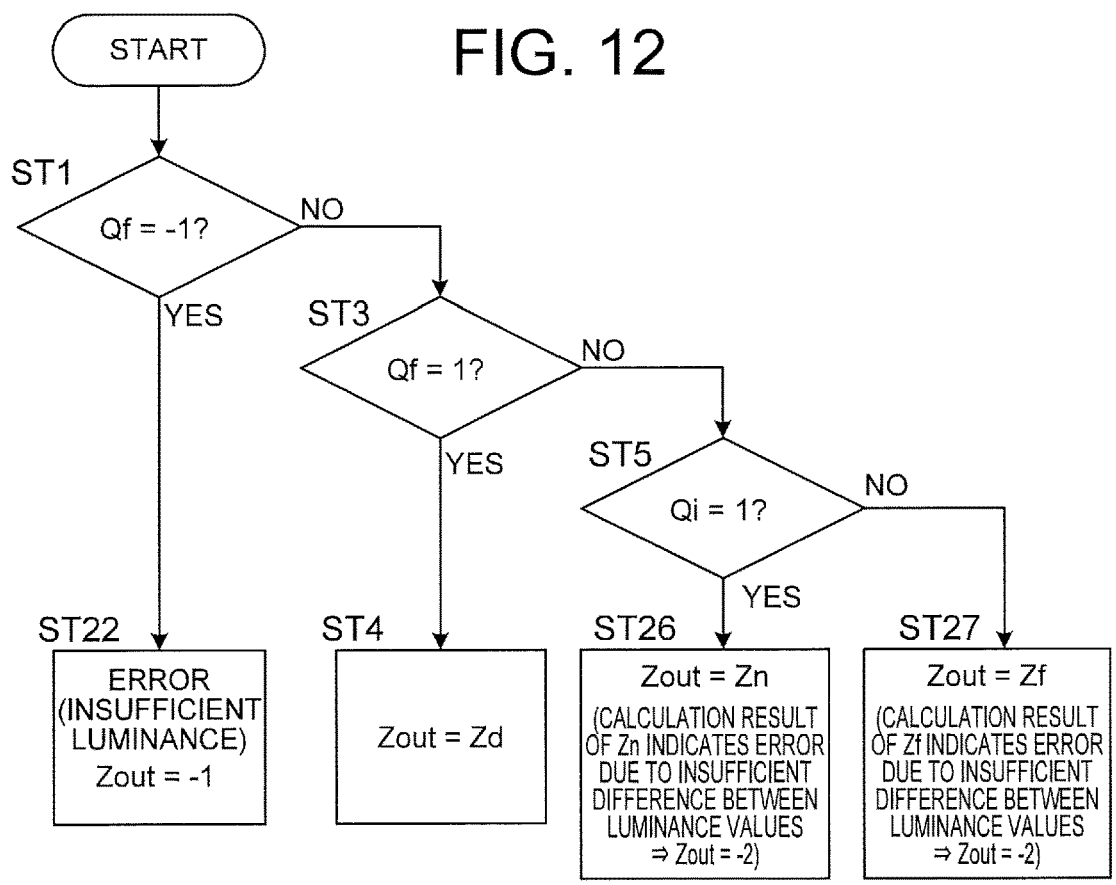
FIG. 12 is a flowchart illustrating processing of outputting a result of measurement of the subject distance by an image data processing unit illustrated in FIG. 11.

FIG. 12 is a flowchart illustrating processing of outputting a result of measurement of the subject distance by the measurement result synthesis unit 23 of the image data processing unit 20 illustrated in FIG. 11. In FIG. 12, the same processing steps as those in FIG. 10 is denoted by the same step numbers as those in FIG. 10. The cases A (A1, A2) and the case B can be distinguished from each other by the occurrence position of an error when the first distance measurement is performed. The processing in FIG. 12 is almost the same as the processing in FIG. 10, however, it enables the cause of the error to be determined by changing a value set as Zout when an error occurs (by setting a value different from that in FIG. 10). Namely, Zout=−1 (step ST22) indicates that an error of the case A has occurred. In addition, Zout=−2 (steps ST26 and ST27) indicates that an error of the case B has occurred.

With respect to a position where an error of the case A has occurred, since there is a possibility that the luminance of the captured image is low, an image is captured by performing exposure control for further brightening the captured image. There are the following control methods for brightening the captured image: extending the exposure time (the time for which the shutter of the imaging unit 12 is open) (method 1); increasing the opening of the diaphragm of the optical system 11 (method 2); and increasing the sensor gain of an image capture element of the imaging unit 12 (method 3). A control unit (not illustrated in the drawings) of the image data processing unit 20 performs control in order of priority, i.e., an order of the (method 1), (method 2), and (method 3), for example, within a settable range based on system constraints. The reason why the (method 1) is given the highest priority is that, assuming that the subject does not move during photographing, the extending the exposure time has no disadvantages to the captured image, however, the increasing the opening of the diaphragm shallows the depth of field of the imaging unit 12 and blurs the captured image easily. In addition, the reason why the (method 3) is given the lowest priority is that the increasing the sensor gain increases the noise of the captured image by the imaging unit 12 and increases the possibility that the magnitude relationship of the luminance between the captured images cannot be determined accurately.

With respect to a portion in which the result of the first distance measurement is Zout=−1, photographing is performed by brightening the captured image and consequently the error has been resolved, the distance measurement result is replaced with a new result. As a result of the above operation, if a portion indicating Zout=−1 still remains, the captured image is further brightened within the range of system constraints, and the photographing and the distance measurement are repeated.

Next, to perform a distance measurement for a portion in which the result of the first distance measurement is Zout=−2, photographing is performed by darkening the captured image. There are the following control methods for darkening the captured image: shortening the exposure time (the time for which the shutter of the imaging unit 12 is open) (method 4); decreasing the opening of the diaphragm of the optical system 11 (method 5); and decreasing the sensor gain of the image capture element of the imaging unit 12 (method 6). The control unit (not illustrated in the drawings) of the image data processing unit 20 performs control in an order of the (method 6), (method 5), and (method 4), within the possible range based on the system constraints. The reason why the (method 6) and (method 5) are given higher priority is that, while the (method 4) has no impact on the image quality, it is highly likely that the (method 6) and (method 5) achieve improvement of the image quality. Regarding a position in which an error has been resolved as a result of darkening the captured image, the distance measurement result is replaced with a new distance measurement result. As a result of the above operation, if a portion indicating Zout=−2 still remains, the captured image is further darkened within the range of the system constraints, and the photographing and the distance measurement are repeated.

Regarding a portion in which an error has not been resolved even as a result of photographing by changing the brightness of the image, since there is a possibility that the portion is a portion (a blind spot) in which the light patterns do not reach, the second and subsequent distance measurements are performed by moving the position of the photographing unit 10b. In this operation, for deciding a moving direction of the photographing unit 10b, results of distance measurements on an upper side and on a lower side of an error occurrence area are compared with each other, and results of distance measurements on a left side and on a right side of the error occurrence area are compared with each other. First, a groups of error occurrence positions that continue in the up-and-down direction and the left-and-right direction is extracted as the error occurrence area.

Figure 13A:
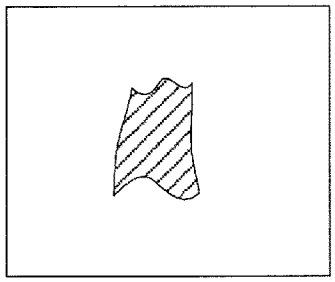
FIG. 13(A) is a diagram illustrating an error occurrence area.

FIG. 13(A) is a diagram illustrating the error occurrence area, and FIGS. 13(B) to 13(E) are diagrams illustrating pixel positions referred to when the moving direction of the photographing unit 10b with respect to the error occurrence area illustrated in FIG. 13(A) is determined.

Figure 13B:
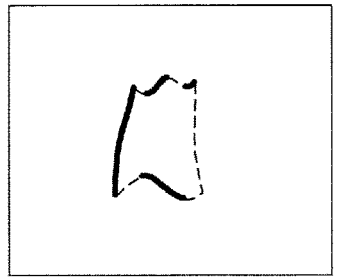
FIGS. 13(B) to 13(E) are diagrams illustrating pixel positions referred to when the moving direction of the photographing unit with respect to the error occurrence area is determined.

As illustrated in FIG. 13(B), when pixels on the left side of the error occurrence area are referred to, pixel positons that meet a condition that the error occurrence area is immediately on the right side of the pixel (pixels indicated by a thick line) are extracted, and an average value of the distance measurement results of the pixel positions is obtained.

Figure 13C:
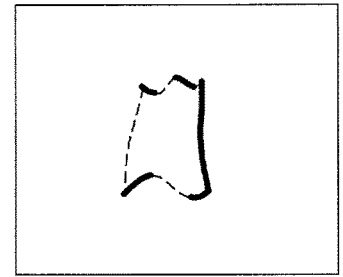

Likewise, as illustrated in FIG. 13(C), when pixels on the right side of the error occurrence area are referred to, pixel positons that meet a condition that the error occurrence area is immediately on the left side of the pixel (pixels indicated by a thick line) are extracted, and an average value of the distance measurement results of the pixel positions is obtained.

Figure 13D:
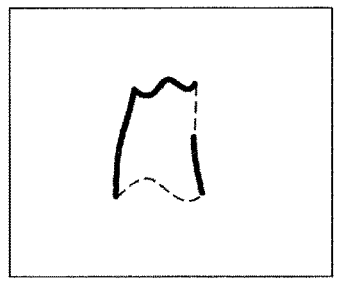

Likewise, as illustrated in FIG. 13(D), when pixels on the upper side of the error occurrence area are referred to, pixel positons that meet a condition that the error occurrence area is immediately on the lower side of the pixel (pixels indicated by a thick line) are extracted, and an average value of the distance measurement results of the pixel positions is obtained.

Figure 13E:
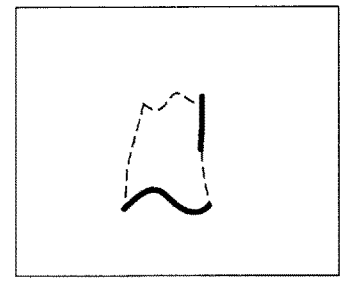

Likewise, as illustrated in FIG. 13(E), when pixels on the lower side of the error occurrence area are referred to, pixel positons that meet a condition that the error occurrence area is immediately on the upper side of the pixel (pixels indicated by a thick line) are extracted, and an average value of the distance measurement results of the pixel positions is obtained.

The average value of the distance measurement results when the pixels on the left side of the error occurrence area illustrated in FIG. 13(B) are referred to is denoted by $Zout\_l$, the average value of the distance measurement results when the pixels on the right side of the error occurrence area illustrated in FIG. 13(C) are referred to is denoted by $Zout\_r$, the average value of the distance measurement results when the pixels on the upper side of the error occurrence area illustrated in FIG. 13(D) are referred to is denoted by $Zout\_u$, the average value of the distance measurement results when the pixels on the lower side of the error occurrence area illustrated in FIG. 13(E) are referred to is denoted by $Zout\_d$, and the moving distance and rotating angle of the photographing unit 10b can be obtained from the magnitude relationship among these values. When a predetermined distance difference threshold is denoted by Tz, the moving distance and the rotating angle of the photographing unit 10b are denoted by M, the control unit 14 changes the position of the photographing unit 10b and the photographing direction of the imaging unit 12 as follows (rotates the photographing unit 10b).

For example, when $Zout\_u > Zout\_d + Tz$, the control unit 14 moves the photographing unit 10b in the upward direction and changes the photographing direction of the imaging unit 12 of the photographing unit 10b in the downward direction by M degrees (for example, an angle corresponding to the moving distance) (rotates the photographing unit 10b).

When $Zout\_u + Tz < Zout\_d$, the control unit 14 moves the photographing unit 10b in the downward direction and changes the photographing direction of the imaging unit 12 of the photographing unit 10b in the upward direction by M degrees (rotates the photographing unit 10b).

When $|Zout\_u - Zout\_d| \leq Tz$, the control unit 14 neither moves the photographing unit 10b in the upward nor downward direction nor changes the photographing direction of the imaging unit 12 of the photographing unit 10b.

For example, when $Zout\_r > Zout\_l + Tz$, the control unit 14 moves the photographing unit 10b in the rightward direction and changes the photographing direction of the imaging unit 12 of the photographing unit 10b in the leftward direction by M degrees (rotates the photographing unit 10b).

When Zout_r+Tz<Zout_l, the control unit 14 moves the photographing unit 10b in the leftward direction and changes the photographing direction of the imaging unit 12 of the photographing unit 10b in the rightward direction by M degrees (rotates the photographing unit 10b).

When |Zout_r−Zout_l|≤Tz, the control unit 14 neither moves the photographing unit 10b in the rightward nor leftward direction nor changes the photographing direction of the imaging unit 12 of the photographing unit 10b (the photographing unit 10b is not rotated).

Figure 14:
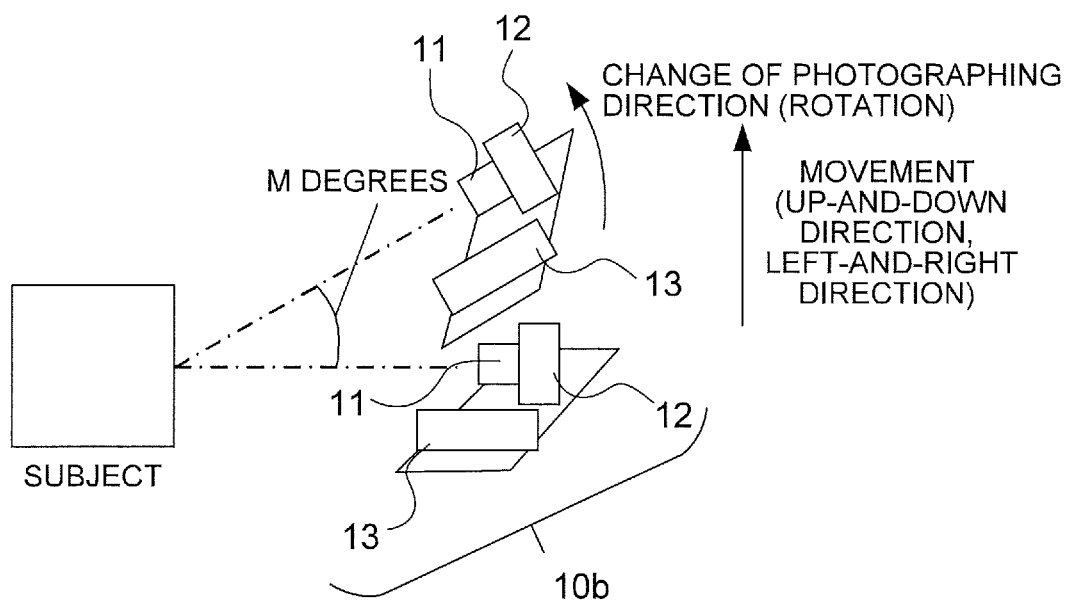
FIG. 14 is a diagram illustrating movement of the position of the photographing unit including an optical system, an imaging unit, and a projection unit illustrated in FIG. 11.

FIG. 14 is a diagram illustrating movement and rotation of the position of the photographing unit 10b including the optical system 11, the imaging unit 12, and the projection unit 13 illustrated in FIG. 11. The photographing unit 10b is moved (translated) in the up-and-down direction or the left-and-right direction from the original position of the photographing unit 10b as a reference. In this operation, the photographing unit 10b is moved so that the center of the angle of view matches the center of the angle of view before the photographing unit 10b is moved. The photographing unit 10b is moved to a position where the change of the photographing direction of the imaging unit 12 of the photographing unit 10b (the rotation of the photographing unit 10b) corresponds to M degrees as a result of the movement. As the result of the determination, if neither movement in the up-and-down direction and the left-and-right direction nor change in the photographing direction is performed, it is judged that enlargement of the distance measurement possible range by moving the photographing unit 10b and changing the photographing direction is difficult, and the distance measurement processing is terminated with respect to the target error occurrence area.

The exposure time set when the photographing unit 10b is moved is the same as that set in the first distance measurement, and according to occurrence of a measurement error at the position after the movement, the photographing is performed by brightening or darkening the captured image in the same way as the first distance measurement.

The measurement result synthesis unit 23 synthesizes the distance data obtained as the result of the photographing by moving the photographing unit 10b with the distance data of the result of the first distance measurement. First, the distance data obtained by the distance measurement performed before the photographing unit 10b is moved is plotted on a three-dimensional space. Next, the distance data acquired after the photographing unit 10b is moved is plotted on the same three-dimensional space. In this operation, if a point of the distance data obtained by the distance measurement performed before the photographing unit 10b is moved exists on a line connecting an additionally plotted point and the imaging unit 12 of the photographing unit 10b, additional plotting is not performed. In this way, by plotting the distance data on the three-dimensional space, only the distance measurement results obtained nearer the photographing unit 10b are plotted. Thus, it is possible to reduce the possibility that a position where the subject actually exists is erroneously determined as a position where the subject is absent due to detection failure in the distance measurement result data.

The movement of the position of the photographing unit 10b and the distance measurement are repeated by the number of error occurrence areas. To reduce the time needed for the distance measurements, a threshold may be set for the number of pixels constituting the error occurrence area. In this case, if the number of pixels included in the error occurrence area is equal to or less than the threshold, processing excluding the error occurrence area from the target of the movement of the photographing unit 10b and the distance measurement may be performed.

In addition, to reduce the time needed for the distance measurements, before the position of the photographing unit 10b is actually moved and the distance measurement is actually performed, the movement and the rotation of the photographing unit 10b and the distance measurement may be performed by listing in advance movement positions of the photographing unit 10b with respect to all error occurrence areas and treating overlapping movement positions of the photographing unit 10b as a single position.

2-3. Effect 2-3. Effect

As described above, according to the distance measurement apparatus 2 and the distance measurement method of the second embodiment, image data is acquired by moving and rotating the photographing unit 10b so as to reduce the error occurrence areas on the basis of the result of the first distance measurement and by changing the exposure condition, the photographing position, and the photographing direction for the second and subsequent distance measurements, and thus the distance measurement is performed. Therefore, areas for which the distance measurement cannot be performed are few and it is possible to acquire the subject distance with high accuracy.

3. Variation

Figure 15:
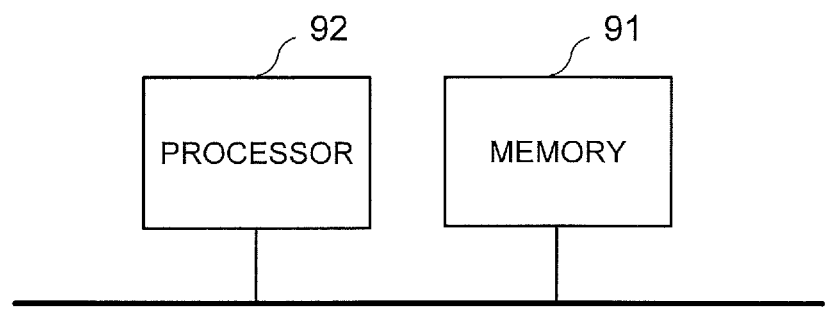
FIG. 15 is a hardware configuration diagram illustrating a configuration of a variation of the distance measurement apparatuses according to the first and second embodiments.

FIG. 15 is a hardware configuration diagram illustrating a configuration of a variation of the image data processing units of the distance measurement apparatuses according to the above first and second embodiments. Each of the image data processing units 20 of the distance measurement apparatuses 1 and 2 may be realized by using a memory 91 as a storage device storing a program as software and a processor 92 as an information processing unit executing the program stored in the memory 91 (for example, by using a computer). In this case, each of the image data processing units 20 in FIGS. 1 and 11 corresponds to the memory 91 and the processor 92 executing the program in FIG. 15. A part of the image data processing unit 20 illustrated in FIG. 1 may be realized by the memory 91 and the processor 92 executing the program in FIG. 15.

DESCRIPTION OF REFERENCE CHARACTERS

1, 2 distance measurement apparatus; 10, 10a image data acquisition unit; 10b photographing unit; 11 optical system; 12 imaging unit; 13 projection unit; 14 control unit; 15 camera arm unit; 20 image data processing unit; 21 first distance measurement unit (image blur determination unit); 22 second distance measurement unit (triangulation unit); 23 measurement result synthesis unit; 24 control unit.

What is claimed is:
1. A distance measurement apparatus comprising:
a projector that projects a plurality of light patterns to a subject;
an optical system including a mechanism that changes a focal length;
a camera that captures images of the subject via the optical system;
a controller that
makes the optical system set the focal length to a first focal length, while the focal length is set to the first focal length, makes the projector project the plurality of light patterns sequentially and makes the camera acquire a plurality of first captured images by capturing a corresponding one of the first captured images while each of the plurality of light patterns is sequentially projected, makes the optical system set the focal length to a second focal length, and while the focal length is set to the second focal length, makes the projector project the plurality of light patterns sequentially and makes the camera acquire a plurality of second captured images by capturing a corresponding one of the second images while each of the plurality of light patterns is sequentially projected;

a processor configured to perform the functions of:

a first distance measurement unit that determines presence or absence of an image blur per pixel from the plurality of first captured images and the plurality of second captured images and acquires a first distance, which is a distance to the subject, per pixel, from an image blur index value indicating an extent of the image blur;

a second distance measurement unit that acquires a second distance, which is a distance to the subject, per pixel, based on triangulation from the plurality of first captured images and the plurality of second captured images; and a measurement result synthesis unit that outputs the first distance for a pixel determined by the first distance measurement unit to be a pixel with the image blur and that outputs the second distance for a pixel determined to be a pixel with no image blur.

2. The distance measurement apparatus according to claim 1, wherein the plurality of light patterns projected by the projector include:

a first light pattern including a first bright area and a first dark area which are alternately arranged regularly in one direction and have a same width in a direction of the arrangement, and a second light pattern including a second dark area and a second bright area which are reverse of the first bright area and the first dark area in the first light pattern.

3. The distance measurement apparatus according to claim 2, wherein the image blur index value is a difference between a maximum value and a minimum value of a normalized difference value obtained by normalizing a difference value between a luminance value of a target pixel in the first captured image obtained when the first light pattern is projected and a luminance value of the target pixel in the second captured image obtained when the second light pattern is projected.

4. The distance measurement apparatus according to claim 3, wherein the second distance measurement unit performs a distance measurement based on triangulation by using a near-focal-position image data acquired by photographing when the focal length is set to the first focal length and a far-focal-position image data acquired by photographing when the focal length is set to the second focal length, and the measurement result synthesis unit outputs, regarding a portion on which the first distance measurement unit determines that one image of the near-focal-position image data and the far-focal-position image data have no image blur and another image has the image blur, a distance measurement result of the image with no image blur, the distance measurement result being obtained by the second distance measurement unit, and outputs, regarding a portion on which the first distance measurement unit determines that neither the near-focal-position image data nor the far-focal-position image data have the image blur, another distance measurement result of one image with a larger image blur index value indicating an image blur amount, the another distance measurement result being obtained by the second distance measurement unit.

5. The distance measurement apparatus according to claim 4, further comprising a camera arm unit that changes positions of the projector, the optical system and the camera, and a photographing direction of the camera, with respect to the subject, wherein, after a first distance measurement is performed by the first distance measurement unit, the second distance measurement unit and the measurement result synthesis unit, intensity of the light patterns from the projector, and the photographing position and the photographing direction of the camera are changed, and then second and subsequent distance measurements are performed by the first distance measurement unit, the second distance measurement unit and the measurement result synthesis unit, and the measurement result synthesis unit synthesizes results obtained by performing of the first and second and subsequent distance measurements and outputs the synthesized results.

6. The distance measurement apparatus according to claim 3, further comprising a camera arm unit that changes positions of the projector, the optical system and the camera, and a photographing direction of the camera, with respect to the subject, wherein, after a first distance measurement is performed by the first distance measurement unit, the second distance measurement unit and the measurement result synthesis unit, intensity of the light patterns from the projector, and the photographing position and the photographing direction of the camera are changed, and then second and subsequent distance measurements are performed by the first distance measurement unit, the second distance measurement unit and the measurement result synthesis unit, and the measurement result synthesis unit synthesizes results obtained by performing of the first and second and subsequent distance measurements and outputs the synthesized results.

7. The distance measurement apparatus according to claim 2, wherein the second distance measurement unit performs a distance measurement based on triangulation by using a near-focal-position image data acquired by photographing when the focal length is set to the first focal length and a far-focal-position image data acquired by photographing when the focal length is set to the second focal length, and the measurement result synthesis unit outputs, regarding a portion on which the first distance measurement unit determines that one image of the near-focal-position image data and the far-focal-position image data have no image blur and another image has the image blur, a distance measurement result of the image with no image blur, the distance measurement result being obtained by the second distance measurement unit, and outputs, regarding a portion on which the first distance measurement unit determines that neither the near-focal-position image data nor the far-focal-position image data have the image blur, another distance measurement result of one image with a larger image blur index value indicating an image blur amount, the another distance measurement result being obtained by the second distance measurement unit.

8. The distance measurement apparatus according to claim 7, further comprising a camera arm unit that changes positions of the projector, the optical system and the camera, and a photographing direction of the camera, with respect to the subject, wherein, after a first distance measurement is performed by the first distance measurement unit, the second distance measurement unit and the measurement result synthesis unit, intensity of the light patterns from the projector, and the photographing position and the photographing direction of the camera are changed, and then second and subsequent distance measurements are performed by the first distance measurement unit, the second distance measurement unit and the measurement result synthesis unit, and the measurement result synthesis unit synthesizes results obtained by performing of the first and second and subsequent distance measurements and outputs the synthesized results.

9. The distance measurement apparatus according to claim 2, further comprising a camera arm unit that changes positions of the projector, the optical system and the camera, and a photographing direction of the camera, with respect to the subject, wherein, after a first distance measurement is performed by the first distance measurement unit, the second distance measurement unit and the measurement result synthesis unit, intensity of the light patterns from the projector, and the photographing position and the photographing direction of the camera are changed, and then second and subsequent distance measurements are performed by the first distance measurement unit, the second distance measurement unit and the measurement result synthesis unit, and the measurement result synthesis unit synthesizes results obtained by performing of the first and second and subsequent distance measurements and outputs the synthesized results.

10. The distance measurement apparatus according to claim 1, wherein the second distance measurement unit performs a distance measurement based on triangulation by using a near-focal-position image data acquired by photographing when the focal length is set to the first focal length and a far-focal-position image data acquired by photographing when the focal length is set to the second focal length, and the measurement result synthesis unit outputs, regarding a portion on which the first distance measurement unit determines that one image of the near-focal-position image data and the far-focal-position image data have no image blur and another image has the image blur, a distance measurement result of the image with no image blur, the distance measurement result being obtained by the second distance measurement unit, and outputs, regarding a portion on which the first distance measurement unit determines that neither the near-focal-position image data nor the far-focal-position image data have the image blur, another distance measurement result of one image with a larger image blur index value indicating an image blur amount, the another distance measurement result being obtained by the second distance measurement unit.

11. The distance measurement apparatus according to claim 10, further comprising a camera arm unit that changes positions of the projector, the optical system and the camera, and a photographing direction of the camera, with respect to the subject, wherein, after a first distance measurement is performed by the first distance measurement unit, the second distance measurement unit and the measurement result synthesis unit, intensity of the light patterns from the projector, and the photographing position and the photographing direction of the camera are changed, and then second and subsequent distance measurements are performed by the first distance measurement unit, the second distance measurement unit and the measurement result synthesis unit, and the measurement result synthesis unit synthesizes results obtained by performing of the first and second and subsequent distance measurements and outputs the synthesized results.

12. The distance measurement apparatus according to claim 1, further comprising a camera arm unit that changes positions of the projector, the optical system and the camera, and a photographing direction of the camera, with respect to the subject, wherein, after a first distance measurement is performed by the first distance measurement unit, the second distance measurement unit and the measurement result synthesis unit, intensity of the light patterns from the projector, and the photographing position and the photographing direction of the camera are changed, and then second and subsequent distance measurements are performed by the first distance measurement unit, the second distance measurement unit and the measurement result synthesis unit, and the measurement result synthesis unit synthesizes results obtained by performing of the first and second and subsequent distance measurements and outputs the synthesized results.

13. The distance measurement apparatus according to claim 12, wherein distance measurement results on an upper side and a lower side of an error occurrence area, in which an error occurs in the first distance measurement by the first distance measurement unit, the second distance measurement unit and the measurement result synthesis unit, are compared with each other, distance measurement results on a left side and a right side of the error occurrence area are compared with each other, and, based on comparison results of the distance measurement results, the camera arm unit moves the projector, the optical system, and the camera and changes the photographing direction of the camera.

14. The distance measurement apparatus according to claim 13, wherein the measurement result synthesis unit performs processing of plotting a point indicated by a subject distance measured before the projector, the optical system and the camera are moved, as a point indicating a measurement distance to be outputted, on a three-dimensional space, and in subject distances measured by moving the projector, the optical system and the camera and by changing the photographing direction of the camera, if a point indicated by a subject distance measured before the camera is moved does not exist on a line connecting a previously plotted point and the camera, additional plotting is performed, and if a point indicated by a subject distance measured before the camera is moved exists on a line connecting a previously plotted point and the camera, additional plotting is not performed.

15. The distance measurement apparatus according to claim 12, wherein the measurement result synthesis unit performs processing of plotting a point indicated by a subject distance measured before the projector, the optical system and the camera are moved, as a point indicating a measurement distance to be outputted, on a three-dimensional space, and in subject distances measured by moving the projector, the optical system and the camera and by changing the photographing direction of the camera, if a point indicated by a subject distance measured before the camera is moved does not exist on a line connecting a previously plotted point and the camera, additional plotting is performed, and if a point indicated by a subject distance measured before the camera is moved exists on a line connecting a previously plotted point and the camera, additional plotting is not performed.

16. A distance measurement method performed by an apparatus including a projector that projects a plurality of light patterns to a subject, an optical system including a mechanism that changes a focal length, and a camera that photographs the subject via the optical system, the distance measurement method comprising:

making the optical system set the focal length to a first focal length;

while the focal length is set to the first focal length, making the projector project the plurality of light patterns sequentially and making the camera acquire a plurality of first captured images by capturing a corresponding one of the first captured images while each of the plurality of light patterns is sequentially projected;

making the optical system set the focal length to a second focal length;

while the focal length is set to the second focal length, making the projector project the plurality of light patterns sequentially and making the camera acquire a plurality of second captured images by capturing a corresponding one of the second captured images while each of the plurality of light patterns is sequentially projected;

determining presence or absence of an image blur per pixel from the plurality of first captured images and the plurality of second captured images and acquiring a first distance, which is a distance to the subject, per pixel, from an image blur index value indicating an extent of the image blur;

acquiring a second distance, which is a distance to the subject, per pixel, based on triangulation from the plurality of first captured images and the plurality of second captured images; and outputting the first distance for a pixel determined to be a pixel with the image blur in the step of acquiring the first distance, and outputting the second distance for a pixel determined to be a pixel with no image blur.

* * * * *